United States Patent
Hamaguchi et al.

(10) Patent No.: US 9,404,022 B2
(45) Date of Patent: Aug. 2, 2016

(54) COMPOSITION FOR VULCANIZING ADHESION

(75) Inventors: Koshiro Hamaguchi, Osaka (JP); Motoki Kitagawa, Osaka (JP); Toyofumi Otaka, Osaka (JP); Taro Ozaki, Osaka (JP); Yoritaka Yasuda, Osaka (JP)

(73) Assignee: OSAKA SODA CO., LTD., Osaka-Shi (JP)

(*) Notice: Subject to any disclaimer, the term of this patent is extended or adjusted under 35 U.S.C. 154(b) by 379 days.

(21) Appl. No.: 13/884,937

(22) PCT Filed: Nov. 10, 2011

(86) PCT No.: PCT/JP2011/075927
§ 371 (c)(1),
(2), (4) Date: May 10, 2013

(87) PCT Pub. No.: WO2012/063895
PCT Pub. Date: May 18, 2012

(65) Prior Publication Data
US 2013/0236670 A1    Sep. 12, 2013

(30) Foreign Application Priority Data

Nov. 12, 2010 (JP) .................................. 2010-254321
Dec. 17, 2010 (JP) .................................. 2010-281207

(51) Int. Cl.
| | |
|---|---|
| *C09J 11/06* | (2006.01) |
| *B32B 1/08* | (2006.01) |
| *C09J 121/00* | (2006.01) |
| *B32B 25/08* | (2006.01) |
| *B32B 27/32* | (2006.01) |
| *C08L 71/03* | (2006.01) |
| *C08K 5/3465* | (2006.01) |

(52) U.S. Cl.
CPC .  *C09J 11/06* (2013.01); *B32B 1/08* (2013.01); *B32B 25/08* (2013.01); *B32B 27/322* (2013.01); *C08L 71/03* (2013.01); *C09J 121/00* (2013.01); *C08K 5/3465* (2013.01); *Y10T 428/1386* (2015.01)

(58) Field of Classification Search
CPC .......... B32B 1/08; B32B 25/08; C09J 121/00; C09J 11/06; C08L 71/03; C08L 71/02; C08L 63/00; Y10T 428/1386; C08K 5/3465
USPC ................ 428/36.9, 36.91, 36.92, 36.8, 35.7
See application file for complete search history.

(56) References Cited

U.S. PATENT DOCUMENTS

| | | | |
|---|---|---|---|
| 3,857,807 A | 12/1974 | Kometani et al. | |
| 3,864,298 A | 2/1975 | Kometani et al. | |
| 6,106,914 A | 8/2000 | Kanbe et al. | |
| 8,283,039 B2 | 10/2012 | Funayama et al. | |
| 8,329,274 B2 | 12/2012 | Sakazaki et al. | |
| 2005/0208248 A1 | 9/2005 | Ilo et al. | |
| 2006/0216518 A1* | 9/2006 | Funayama et al. | 428/413 |
| 2007/0231522 A1 | 10/2007 | Sakazaki et al. | |
| 2007/0264495 A1* | 11/2007 | Resmini et al. | 428/339 |
| 2010/0297452 A1 | 11/2010 | Funayama et al. | |

FOREIGN PATENT DOCUMENTS

| | | | |
|---|---|---|---|
| EP | 1096190 A1 | 5/2001 | |
| EP | 2450399 | * | 12/2012 |
| EP | 2639059 A1 | 9/2013 | |
| JP | 64-11180 A | 1/1989 | |
| JP | 9-85898 A | 3/1997 | |
| JP | 10-264314 A | 10/1998 | |
| JP | 11-315966 A | 11/1999 | |
| JP | 2003-155409 A | 5/2003 | |
| JP | 2003-268329 | * | 9/2003 |
| JP | 2003-268329 A | 9/2003 | |
| JP | 2006-021363 A | 1/2006 | |
| JP | 2006-306053 A | 11/2006 | |
| JP | 2007-261079 A | 10/2007 | |
| JP | 2009-056632 A | 3/2009 | |
| WO | 2008/139967 A1 | 11/2008 | |
| WO | 2009/096427 A1 | 8/2009 | |

OTHER PUBLICATIONS

English machine translation of JP2003-268329.*
Offer of Information submitted Aug. 26, 2014 in corresponding JP Application No. 2012-542972.
Office Action issued Jan. 4, 2015 in corresponding Chinese Patent Application No. 201180054478.7.
Notification of Reasons for Refusal drafted Mar. 2, 2015 in corresponding JP Application No. 2012-542972.
Extended European Search reported issued Dec. 4, 2014 in corresponding EP Application No. 11840371.6.
Office Action issued Sep. 6, 2015 in corresponding CN application No. 201180054478.7.

* cited by examiner

*Primary Examiner* — Yan Lan
(74) *Attorney, Agent, or Firm* — Knobbe Martens Olson & Bear LLP

(57) ABSTRACT

A composition for vulcanizing adhesion, comprises a rubber (a), at least one compound (b) selected from the group consisting of salts of 1,8-diazabicyclo(5.4.0) undecene-7, salts of 1,5-diazabicyclo(4.3.0)-nonene-5, 1,8-diazabicyclo(5.4.0) undecene-7, and 1,5-diazabicyclo(4.3.0)-nonene-5, and at least one water-carrying substance (c) selected from water-absorbed substances and hydrated substances.

14 Claims, No Drawings

US 9,404,022 B2

COMPOSITION FOR VULCANIZING ADHESION

CROSS-REFERENCE TO RELATED APPLICATIONS

This application is the U.S. National Phase under 35. U.S.C. §371 of International Application PCT/JP2011/075927, filed Nov. 10, 2011, which claims priority to Japanese Patent Application No. 2010-254321, filed Nov. 12, 2010, and Japanese Patent Application No. 2010-281207, filed Dec. 17, 2010. The disclosures of the above-described applications are hereby incorporated by reference in their entirety. The International Application was published under PCT Article 21(2) in a language other than English.

TECHNICAL FIELD

The present invention relates to a composition for vulcanizing adhesion.

BACKGROUND ART

In recent years, regulations against exhaust gas from automobiles have been becoming very severe. A gasoline-evapotranspiration regulation, which is one of the regulations, has been increasingly enforced. In response to such severe demands, about fuel hoses for automobiles, developments have been advanced in such a manner that the fuel hoses can have heat aging resistance, weather resistance, rancidity gasoline resistance, alcohol-containing gasoline resistance, gasoline impermeability, and others together. One material of the fuel hoses is fluorine-contained polymer. However, fluorine-contained polymer is expensive, and also has a problem against cold resistance. Thus, a laminated body is frequently used in which a thin layer of fluorine-contained polymer is used as an inside layer and epichlorohydrin rubber is used for an outside layer.

However, in the case of a laminate hose composed of different-kind polymer compositions as described above, the adhesiveness between the laminated layers of the hose has been becoming most important. It is generally known that fluorine-contained polymer is poor in adhesiveness to polymers different in kind. Thus, a countermeasure is adopted thereagainst, an example thereof being the blend of an additive into a composition of the polymer. In the case of a laminated body composed of a fluorine-contained polymer layer and an epichlorohydrin rubber layer, manners described in Patent Documents 1 to 3 are adopted to make it possible to bond the fluorine-contained polymer layer and the epichlorohydrin rubber layer to each other. In recent years, however, materials of hoses have been changed or unified to make the lifespan thereof longer without performing any maintenance or optimize members to which the hoses are adapted; thus, laminate bodies have been desired in which various other kind rubbers are strongly bonded to various gas permeability resistant materials, respectively.

PRIOR ART DOCUMENTS

Patent Documents

Patent Document 1: JP-A-64-11180
Patent Document 2: JP-A-9-85898
Patent Document 3: JP-A-2006-306053

SUMMARY OF THE INVENTION

Problems to be Solved by the Invention

An object of the present invention is to provide a composition for vulcanizing adhesion that can give a vulcanized product excellent in adhesiveness to other gas permeability resistant materials (for example, fluorine-contained polymer).

Means for Solving the Problems

The present invention relates to a composition for vulcanizing adhesion comprising a rubber (a), at least one compound (b) selected from the group consisting of salts of 1,8-diazabicyclo(5.4.0) undecene-7, salts of 1,5-diazabicyclo (4.3.0)-nonene-5, 1,8-diazabicyclo(5.4.0) undecene-7 and 1,5-diazabicyclo(4.3.0)-nonene-5, and at least one water-carrying substance (c) selected from water-absorbed substances and hydrated substances.

Effect of the Invention

A vulcanized product obtained by vulcanizing the composition of the present invention for vulcanizing adhesion is excellent in vulcanizing adhesiveness to polymers different in kind. For example, the product is combined with a fluorine-contained polymer so as to be used as a laminated body or some other article.

MODE FOR CARRYING OUT THE INVENTION

The composition of the present invention for vulcanizing adhesion comprises a rubber (a), at least one compound (b) selected from the group consisting of salts of 1,8-diazabicyclo(5.4.0) undecene-7, salts of 1,5-diazabicyclo(4.3.0)-nonene-5, 1,8-diazabicyclo(5.4.0) undecene-7 and 1,5-diazabicyclo(4.3.0)-nonene-5, and at least one water-carrying substance (c) selected from water-absorbed substances and hydrated substances.

The rubber (a) may be classified into at least one rubber selected from the group consisting of acrylonitrile butadiene rubber (NBR), hydrogenated NBR (H-NBR), acrylate rubber (ACM), ethylene acrylate rubber (AEM), fluorine-contained rubber (FKM), chloroprene rubber (CR), chlorosulfonated polyethylene (CSM), chlorinated polyethylene (CPE), and ethylene propylene rubbers (EPM and EPDM); and epichlorohydrin rubber.

In the composition of the present invention for vulcanizing adhesion, acrylonitrile butadiene rubber (hereinafter abbreviated to NBR) which is the rubber (a) is not particularly limited as far as the rubber is a rubber containing polymerization units based on acrylonitrile and butadiene. The copolymerization composition of acrylonitrile and butadiene is not particularly limited. Generally, a copolymer may be used in which the content by percentage of bonded acrylonitrile is from 30 to 50% both inclusive. It is also allowable to use, for example, a blend composed of NBR and vinyl chloride resin (hereinafter abbreviated to PVC), or a blend composed of NBR, and ethylene propylene diene rubber (EPDM). It is also allowable to use, for example, acrylate-modified NBR, partially crosslinked NBR, or terminal-modified NBR. The form thereof is not particularly limited as far as the form is an ordinary form of NBR. Thus, powdery NBR or liquid NBR may be used.

A crosslinking agent (vulcanizing agent) for the NBR is not particularly limited, and may be generally any agent for crosslinking an unsaturated bond. Specifically, the crosslinking agent is preferably, for example, a sulfur-containing crosslinking agent, a peroxide crosslinking agent, a resin crosslinking agent, an oxime crosslinking agent or the like. The crosslinking agent is preferably a sulfur-containing crosslinking agent, or a peroxide crosslinking agent. The composition for vulcanizing adhesion may contain a thiuram compound such as tetramethyldisulfide and the like; a salt of dithiocarbamic acid (for example, a zinc salt of dithiocarbamic acid, or a copper salt of dithiocarbamic acid) such as zinc diethyldithiocarbamate, copper dimethyldithiocarbamate and the like; or some other known accelerator, acceleration auxiliary, and retardant that each correspond appropriately to the crosslinking agent.

Examples of the sulfur-containing crosslinking agent include sulfur, tetramethylthiuram disulfide, tetraethylthiuram disulfide, tetrabutylthiuram disulfide, tetramethylthiuram monosulfide, dipentamethylenethiuram tetrasulfide or the like.

Examples of the peroxide crosslinking agent include as tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy)hexane, benzoyl peroxide, tert-butyl peroxybenzoate or the like.

Examples of the resin vulcanizing agent include alkylphenol/formaldehyde resin, a melamine/formaldehyde condensed product, a triazine/formaldehyde condensed product, octylphenol/formaldehyde resin, alkylphenol/sulfide resin, hexamethoxymethyl/melamine resin or the like.

Examples of the oxime crosslinking agent include p-quinone dioxime, p-benzoquinone dioxime, and p,p'-dibenzoylquinone dioxime.

The blend amount of the crosslinking agent (vulcanizing agent) is not limited as far as the advantageous effects of the present invention are not damaged. The amount is preferably from 0.1 to 10 parts by weight for 100 parts by weight of the NBR.

In the composition of the present invention for vulcanizing adhesion, hydrogenated NBR (hereinafter abbreviated to H-NBR) which is the rubber (a) is not particularly limited as far as the rubber has a structure in which the butadiene units of the NBR are hydrogenated. The composition thereof is not particularly limited. Since H-NBR is generally produced from NBR, the composition is equivalent to that of the NBR. It is allowable to use a rubber obtained by hydrogenating all of the butadiene units, or a rubber obtained by hydrogenating the units to cause a part of unsaturated bonds thereof to remain. It is allowable to use, as well as the NBR, a blend of NBR and another polymer, or a modified product of NBR. About the kind of a crosslinking agent (vulcanizing agent) therefor, a blend amount thereof, and other compounding agents, it is allowable in the same manner as in the NBR to use appropriately a thiuram compound such as tetramethyl disulfide and the like; a salt of dithiocarbamic acid (for example, a zinc salt of dithiocarbamic acid, or a copper salt of dithiocarbamic acid) such as zinc diethyldithiocarbamate, copper dibutyldithiocarbamate and the like; or some other known accelerator, acceleration auxiliary, and retardant that each correspond appropriately to the crosslinking agent.

In the composition of the present invention for vulcanizing adhesion, acrylic rubber (hereinafter abbreviated to ACM) as the rubber (a) is not particularly limited as far as the rubber is a synthetic rubber obtained by polymerizing a polymerization unit made mainly of an acrylate. A side-chain alkyl group or an alkoxy alkyl group of the acrylate is not particularly limited, and is generally decided in accordance with a balance between the oil resistance and the cold resistance. The acrylate is preferably an alkyl acrylate in which the alkyl has 1 to 4 carbon atoms, or an alkoxyalkyl acrylate in which the alkoxy group has 1 to 4 carbon atoms. Examples thereof include methyl acrylate, ethyl acrylate, propyl acrylate, n-butyl acrylate, methoxymethyl acrylate, methoxyethyl acrylate, ethoxyethyl acrylate, butoxyethyl acrylate or the like. A rubber may be generally used in which a functional group that may be of various types is introduced, as side chains, into crosslinking sites thereof. Ordinary examples of a monomer used in the crosslinking sites include 2-chloroethyl vinyl ether, and other chlorine radical containing monomers; vinyl chloroacetate and other active chlorine radical containing monomers; and allyl glycidyl ether, glycidyl acrylate, and other epoxy group containing monomers. The proportion of units of the monomer used in the crosslinking sites may be from 0.1 to 10% by weight for 100% by weigh of the acrylate monomer units in ACM.

A crosslinking agent (vulcanizing agent) for the ACM is not particularly limited. A known crosslinking agent may be appropriately used in accordance with the monomer used in the crosslinking sites. Ordinary examples of the crosslinking agent are given; when the monomer used in the crosslinking sites is a chlorine radical containing monomer, the crosslinking agent may be, for example, hexamethylenediaminocarbamate, ethylene thiourea, N,N'-diethylthiourea, dipentamethylene thiuramtetrasulfide (TRA) or the like. When the monomer used in the crosslinking sites is an active chlorine radical containing monomer, the crosslinking agent may be, for example, sulfur, TRA, diamine carbamate, 2,4,6-trimercapto-1,3,5-triazine or the like. When the monomer used in the crosslinking sites is an epoxy group containing monomer, the crosslinking agent may be, for example, a salt of dithiocarbamic acid, or an ammonium organic carboxylate. The peroxide crosslinking agent and the others described in the item of the NBR may be used. In accordance with each of the crosslinking agents, it is allowable to use appropriately a metal compound, a metal oxide, a metal soap, an acid receiving agent such as a salt of dithiocarbamic acid (for example, a zinc salt of dithiocarbamic acid, or a copper salt of dithiocarbamic acid) such as zinc diethyldithiocarbamate or copper dibutyldithiocarbamate, a accelerator, and various compounding agents.

The blend amount of the crosslinking agent (vulcanizing agent) is not particularly limited as far as the advantageous effects of the present invention are not damaged. The amount is preferably from 0.1 to 10 parts by weight for 100 parts by weight of the ACM.

In the composition of the present invention for vulcanizing adhesion, the ethylene acrylate rubber (hereinafter abbreviated to AEM) which is the rubber (a) is a copolymer made from ethylene and an acrylate. A copolymer obtained by introducing, into crosslinking sites thereof, a functional group that may be of various types, is generally used. An ordinary example of the crosslinking sites is side chain sites to which carboxyl groups are to be introduced. The composition ratio between ethylene and the acrylate is not particularly limited, and is decided in accordance with the oil resistance, the cold resistance, and the workability. The proportion of units of the monomer used in the crosslinking sites may be from 0.1 to 10% by weight for 100% by parts of the total of monomer units of the acrylate and monomer units of ethylene in the AEM.

A crosslinking agent (vulcanizing agent) for the AEM is not particularly limited. Thus, a known crosslinking agent may be appropriately used. Ordinary examples of the crosslinking agent include diamine crosslinking agents such as hexamethylenediamine, hexamethylenediaminocarbamate, and ethylenediamine and the like; and the peroxide crosslinking agents described in the item of the NBR. The composition for vulcanizing adhesion may contain a thiuram compound such as tetramethyl disulfide and the like; a salt of dithiocarbamic acid (for example, a zinc salt of dithiocarbamic acid, or a copper salt of dithiocarbamic acid) such as zinc diethyldithiocarbamate, copper dibutyldithiocarbamate and the like; or some other known accelerator, acceleration auxiliary and retardant, and other known various compounding agents that each correspond appropriately to the crosslinking agent.

The blend amount of the crosslinking agent (vulcanizing agent) is not particularly limited as far as the advantageous effects of the present invention are not damaged. The amount is preferably from 0.1 to 10 parts by weight for 100 parts by weight of the AEM.

In the composition of the present invention for vulcanizing adhesion, the fluorine-contained rubber (hereinafter abbreviated to FKM) is a synthetic rubber containing, in its main chain or side chain (s), a fluorine atom. The composition of the FKM may be generally a known composition. Examples thereof include vinylidene fluoride/hexafluoropropylene copolymer, vinylidene fluoride/hexafluoropropylene/tetrafluoroethylene terpolymer, tetrafluoroethylene/propylene copolymer, tetrifluoroethylene/propylene/vinylidene fluoride terpolymer, tetrafluoroethylene/perfluoro(alkyl vinyl ether) copolymer or the like. It is allowable to use a product obtained by introducing crosslinking sites into anyone of these polymers. It is also allowable to use a product obtained by introducing bromine or iodine into the polymer for improving crosslinking property for peroxide crosslinking. The composition ratio of each of these polymers is not particularly limited, and may be a known ratio.

A crosslinking agent (vulcanizing agent) for the FKM is not particularly limited. Thus, a known crosslinking system may be appropriately used. Examples thereof are given; examples of a polyamine crosslinking agent include hexamethylenediamine carbamate, N,N'-dicinnamilidene-1,6-hexamethylenediamine, 4,4'-bis(aminocyclohexyl)methane carbamate or the like; examples of a polyol crosslinking agent include bisphenol S, bisphenol AF or the like; and examples of a peroxide crosslinking agent include the various peroxides given in the item of NBR. The composition for vulcanizing adhesion may contain a thiuram compound such as tetramethyl disulfide and the like; a salt of dithiocarbamic acid (for example, a zinc salt of dithiocarbamic acid, or a copper salt of dithiocarbamic acid) such as zinc diethyldithiocarbamate, copper dibutyldithiocarbamate and the like; or some other known accelerator, acceleration auxiliary and retardant, and other various compounding agents that each correspond appropriately to the crosslinking agent.

The blend amount of the crosslinking agent (vulcanizing agent) is not particularly limited as far as the advantageous effects of the present invention are not damaged. The amount is preferably from 0.1 to 10 parts by weight for 100 parts by weight of the FKM.

In the composition of the present invention for vulcanizing adhesion, the chloroprene rubber (hereinafter abbreviated to CR) which is the rubber (a) is a polymer made from a chloroprene monomer. The method for synthesizing chloroprene is classified into an acetylene method and a butadiene method. The CR may be any CR obtained by polymerizing a chloroprene monomer by either one of these synthesizing methods. When a chloroprene monomer is polymerized, the resultant polymer usually has a structure composed of a trans-1,4-polychloroprene unit, a cis-1,4-polychloroprene unit, a 1,2-polychloroprene unit, and a 3,4-polychloroprene unit. The composition ratio between these units is not particularly limited. It is allowable to use a known modified product of chloroprene rubber that is modified with sulfur, a mercapto group, or some other. The CR may be a copolymer made from a chloroprene monomer and a monomer copolymerizable with chloroprene. Examples of the copolymerizable monomer include 2,3-dichloro-1,3-butadiene, 1-chloro-1,3-butadiene, butadiene, isoprene, styrene, acrylonitrile, acrylic acid or esters thereof, and methacrylic acid or esters thereof.

A crosslinking agent (vulcanizing agent) for the CR is not particularly limited. Thus, a known crosslinking agent may be appropriately used. Preferred examples of the known crosslinking agent include metal oxides. Specific examples thereof include zinc oxide, magnesium oxide, lead oxide, trilead tetraoxide, iron trioxide, titanium dioxide, calcium oxide or the like. These may be used in combination of two or more thereof. Together with the crosslinking agent, the following is usable as a vulcanizing accelerator: thiourea vulcanizing accelerators, guanidine vulcanizing accelerators, thiuram vulcanizing accelerators, and thiazole vulcanizing accelerators. Thiourea vulcanizing accelerators are preferred. Examples of the thiourea vulcanizing accelerators include ethylenethiourea, diethylthiourea, trimethylthiourea, trimethylthiourea, N,N'-diphenylthiourea or the like. The composition may contain various compounding agents, such as a salt of dithiocarbamic acid (for example, a zinc salt of dithiocarbamic acid, or a copper salt of dithiocarbamic acid) such as zinc diethyldithiocarbamate, copper dibutyldithiocarbamate and the like.

The blend amount of the crosslinking agent (vulcanizing agent) is not particularly limited as far as the advantageous effects of the present invention are not damaged. The amount is preferably from 0.1 to 10 parts by weight for 100 parts by weight of the CR.

In the composition of the present invention for vulcanizing adhesion, chlorosulfonated polyethylene (hereinafter abbreviated to CSM) which is the rubber (a) is a synthetic rubber obtained by using chlorine and sulfurous acid gas to chlorinated and chlorosulfonated polyethylene. The molecular weight, the chlorine content by percentage, the content of chlorosulfone groups therein are not particularly limited, and may be known ones.

A crosslinking agent (vulcanizing agent) for the CSM is not particularly limited. Thus, a known crosslinking agent may be appropriately used. Examples of the known crosslinking agent include metal oxides such as magnesium oxide and the like, maleimide compounds such as N,N'-m-phenylene-dimaleimide and the like, the peroxides described in the item of the NBR, and thiuram compounds such as dipentamethylenethiuram tetrasulifde, tetramethylthiuram disulfide, tetraethylthiuram disulfide and the like, and the like. It is allowable to use a salt of dithiocarbamic acid (for example, a zinc salt of dithiocarbamic acid, or a copper salt of dithiocarbamic acid) such as zinc diethyldithiocarbamate, copper dibutyldithiocarbamate and the like; some other known accelerator, acceleration auxiliary and retardant that each correspond appropriately to the crosslinking agent; or optionally an anti-aging agent (for example, an amine anti-aging agent or a phenol anti-aging agent).

The blend amount of the crosslinking agent (vulcanizing agent) is not particularly limited as far as the advantageous effects of the present invention are not damaged. The amount is preferably from 0.1 to 10 parts by weight for 100 parts by weight of the CSM.

In the composition of the present invention for vulcanizing adhesion, chlorinated polyethylene (hereinafter abbreviated to CPE) which is the rubber (a) is a synthetic rubber obtained by chlorinating polyethylene with chlorine gas. The molecular weight and the chlorine content are not particularly limited, and may be known ones.

A crosslinking agent (vulcanizing agent) for the CPE is not particularly limited. Thus, a known crosslinking agent may be appropriately used. Examples of the known crosslinking agent include mercaptotriazine crosslinking agents such as mercapto-5-triazine, 2-hexylamino-4,6-dimercaptotriazine, 2-diethylamino-4,6-dimercaptotriazine, 2-cyclohexylamino-4,6-dimercaptotriazine, 2-dibutylamino-4,6-dimercaptotriazine, 2-anilino-4,6-dimercaptotriazine, 2-phenylamino-4,6-dimercaptotriazine and the like; thiadiazole crosslinking agents such as 2,5-dimercapto-1,3,4-thiadiazole, a monobenzoate derivative of 2,5-dimercapto-1,3,4-thiadiazole, a dibenzoate derivative of 2,5-dimercapto-1,3,4-thiadiazole and the like; and the various peroxides described in the item of the NBR. The composition for vulcanizing adhesion may contain a thiuram compound such as tetramethyl disulfide and the like; a salt of dithiocarbamic acid (for example, a zinc salt of dithiocarbamic acid, or a copper salt of dithiocarbamic acid) such as zinc diethyldithiocarbamate, copper dibutyldithiocarbamate and the like; or some other known accelerator, acceleration auxiliary and retardant, and other known various compounding agents that each correspond appropriately to the crosslinking agent.

The blend amount of the crosslinking agent (vulcanizing agent) is not particularly limited as far as the advantageous effects of the present invention are not damaged. The amount is preferably from 0.1 to 10 parts by weight for 100 parts by weight of the CPE.

In the composition of the present invention for vulcanizing adhesion, ethylene propylene rubbers (EPM and EPDM) which are each the rubber (a) are, respectively, a copolymer made from ethylene and propylene (hereinafter abbreviated to EPM), and a copolymer in which a diene component is introduced as a third component thereinto (hereinafter abbreviated to EPDM). The diene component as the third component may be known one. Examples thereof include dicyclopentadiene, 5-ethylidene-2-norbornene, 1,4-hexadiene and the like. The composition may be known one. The molecular weight and the form thereof are not particularly limited, either, and may be known ones.

A crosslinking agent (vulcanizing agent) for the EPM and the EPDM, which are each the rubber (a), is not particularly limited. Thus, a known crosslinking agent may be appropriately used. Examples of the known crosslinking agent include sulfur-containing crosslinking agents, peroxide crosslinking agents, resin crosslinking agents, oxime crosslinking agents and the like. Specific examples thereof include the sulfur-containing crosslinking agents, peroxide crosslinking agents, resin crosslinking agents, and oxime crosslinking agents described in the item of the NBR. The composition for vulcanizing adhesion may contain a thiuram compound such as tetramethyl disulfide and the like; a salt of dithiocarbamic acid (for example, a zinc salt of dithiocarbamic acid, or a copper salt of dithiocarbamic acid) such as zinc diethyldithiocarbamate or copper dibutyldithiocarbamate and the like; or some other known accelerator, acceleration auxiliary and retardant, and other known various compounding agents that each correspond appropriately to the crosslinking agent.

The blend amount of the crosslinking agent (vulcanizing agent) is not particularly limited as far as the advantageous effects of the present invention are not damaged. The amount is preferably from 0.1 to 10 parts by weight for 100 parts by weight of the EPM and/or EPDM.

The method for crosslinking the rubber (a) may be a known crosslinking method, such as electron beam crosslinking, radial ray crosslinking, optical crosslinking, microwave crosslinking, ultrasonic wave crosslinking and the like.

In the composition of the present invention for vulcanizing adhesion, the epichlorohydrin rubber which is the rubber (a) is not particularly limited as far as the rubber is an unvulcanized rubber having a polymerization unit based on epichlorohydrin. The epichlorohydrin rubber may be a unary polymer made substantially of only a polymerization unit based on epichlorohydrin, or may be a binary or higher polymer composed of a polymerization unit based on epichlorohydrin and a polymerization unit based on a monomer other than epichlorohydrin.

The monomer other than epichlorohydrin is preferably, for example, at least one monomer selected from the group consisting of ethylene oxide, propylene oxide, and allyl glycidyl ether. The composition for vulcanizing adhesion is preferably a polymer having a polymerization unit based on epichlorohydrin and a polymerization unit based on ethylene oxide, and is more preferably a polymer having a polymerization unit based on epichlorohydrin, a polymerization unit based on ethylene oxide, and a polymerization unit based on allyl glycidyl ether.

The epichlorohydrin rubber is preferably at least one polymer selected from the group consisting of epichlorohydrin homopolymer, epichlorohydrin/ethylene oxide copolymer, epichlorohydrin/allyl glycidyl ether copolymer, epichlorohydrin/ethylene oxide/ally glycidyl ether copolymer, epichlorohydrin/propylene oxide copolymer, epichlorohydrin/propylene oxide/ally glycidyl ether copolymer, and epichlorohydrin/ethylene oxide/propylene oxide/ally glycidyl ether quaternary polymer. The epichlorohydrin rubber is more preferably at least one polymer selected from the group consisting of epichlorohydrin/ethylene oxide copolymer, and epichlorohydrin/ethylene oxide/ally glycidyl ether copolymer. These may be used alone or in the form of a mixture of two or more thereof.

When the epichlorohydrin rubber is used as the rubber (a) in the composition of the present invention for vulcanizing adhesion, the composition further contains a vulcanizing agent (e). The vulcanizing agent (e) may be one known conventionally.

The vulcanizing agent (e) may be a known vulcanizing agent using the reactivity of a chorine atom. Examples thereof include polyamine vulcanizing agents, thiourea vulcanizing agents, thiadiazole vulcanizing agents, mercaptotriazine vulcanizing agents, pyrazine vulcanizing agents, quinoxaline vulcanizing agents, bisphenol vulcanizing agents or the like.

Examples of the known vulcanizing agent (e) using the reactivity of a chlorine atom are given; examples of the polyamine vulcanizing agents include ethylenediamine, hexamethylenediamine, diethylenetriamine, triethylenetetramine, hexamethylenetetramine, p-phenylenediamine, cumenediamine, N,N'-dicinnamylidene-1,6-hexadiamine, ethylenediamine carbamate, hexamethylenediamine carbamate or the like.

Examples of the thiourea vulcanizing agents include ethylenethiourea, 1,3-diethylthiourea, 1,3-dibutylthiourea, trimethylthiourea or the like.

Examples of the thiadiazole vulcanizing agents include 2,5-dimercapto-1,3,4-thiadiazole, 2-mercapto-1,3,4-thiadiazole-5-thiobenzoate or the like.

Examples of the mercaptotriazine vulcanizing agents include 2,4,6-trimercapto-1,3,5-triazine, 2-methoxy-4,6-dimercaptotriazine, 2-hexylamino-4,6-dimercaptotriazine, 2-diethylamino-4,6-dimercaptotriazine, 2-cyclohexaneamino-4,6-dimercaptotriazine, 2-dibutylamino-4,6-dimercaptotriazine, 2-anilino-4,6-dimercaptotriazine, 2-phenylamino-4,6-dimercaptotriazine or the like.

Examples of the pyrazine vulcanizing agents include 2,3-dimercaptopyrazine derivatives or the like. Examples of the 2,3-dimercaptopyrazine derivatives include pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, 5,6-dimethylpyrazine-2,3-dithiocarbonate or the like.

Examples of the quinoxaline vulcanizing agents include 2,3-dimercaptoquinoxaline derivatives or the like. Examples of the 2,3-dimercaptoquinoxaline derivatives include quinoxaline-2,3-dithiocarbonate, 6-methylquinoxaline-2,3-dithiocarbonate, 6-ethyl-2,3-dimercaptoquinoxaline, 6-isopropylquinoxaline-2,3-dithiocarbonate, 5,8-dimethylquinoxaline-2,3-dithiocarbonate or the like.

Examples of the bisphenol vulcanizing agents include 4,4'-dihydroxydiphenylsulfoxide, 4,4'-dihydroxydiphenylsulfone (bisphenol S), 1,1-cyclohexylidene-bis(4-hydroxybenzene), 2-chloro-1,4-cyclohexylene-bis(4-hydroxybenzene), 2,2-isopropylidene-bis(4-hydroxybenzene) (bisphenol A), hexafluoroisopropylidene-bis(4-hydroxybenzene) (bisphenol AF), 2-fluoro-1,4-phenylene-bis(4-hydroxybenzene) or the like.

When the epichlorohydrin rubber is used as the rubber (a), a known vulcanizing accelerator and retardant may be used, as they are, together with the vulcanizing agent (e) in the present invention. The vulcanizing accelerator used together with the known vulcanizing agent (e) using the reactivity of a chlorine atom include primary, secondary and tertiary amines, organic acid salts or adducts of the amines, guanidine accelerators, thiuram accelerators, dithiocarbamic acid accelerators or the like. Examples of the retardant include N-cyclohexanethiophthalimide, zinc salts of dithiocarbamic acids or the like.

Examples of the vulcanizing accelerator are given; particularly preferred examples of the primary, secondary and tertiary amines include primary, secondary and tertiary amines each made from an aliphatic or cyclic aliphatic acid having 5 to 20 carbon atoms. Typical examples of these amines include n-hexylamine, octylamine, dibutylamine, tributyl amine, hexamethylenediamine or the like.

Examples of an organic acid to be combined with any one of the amines to form a salt include carboxylic acids, carbamic acids, 2-mercaptobenzothiazole, dithiophosphoric acid or the like. Examples of a substance to be combined with any one of the amines to form an adduct include alcohols, oximes or the like. Specific examples of the organic acid salts or the adducts of the amines include a n-butylamine/acetate salt, a hexamethylenediamine/carbamate salt, a dicyclohexylamine salt of 2-mercaptobenzothiazole or the like.

Examples of the guanidine type accelerators include diphenylguanidine, ditolylguanidine or the like.

Specific examples of the thiuram type accelerators include tetramethylthiuram disulfide, tetramethylthiuram monosulfide, tetraethylthiuram disulfide, tetrabutylthiuram disulfide, dipentamethylenethiuram tetrasulfide or the like.

Examples of the dithiocarbamic acid type accelerators include a piperidine salt of pentamethylenedithiocarbamate or the like.

The blend amount of the vulcanizing accelerator or retardant used together with the known vulcanizing agent (e) using the reactivity of a chlorine atom is preferably from 0 to 10 parts by weight, more preferably from 0.1 to 5 parts by weight for 100 parts by weight of the rubber component.

When the epichlorohydrin rubber is a polymer having a double bond, such as epichlorohydrin/ally glycidyl ether copolymer, epichlorohydrin/ethylene oxide/ally glycidyl ether terpolymer and the like, for example, the vulcanizing agent may be a known vulcanizing agent used ordinarily for vulcanizing nitrile rubber, such as a sulfur-containing vulcanizing agent, a peroxide vulcanizing agent, a resin vulcanizing agent, a quinone dioxime vulcanizing agent and the like.

Examples of the sulfur-containing vulcanizing agent include sulfur, morpholine disulfide, tetramethylthiuram disulfide, tetraethylthiuram disulfide, tetrabutylthiuram disulfide, N,N'-dimethyl-N,N'-diphenylthiuram disulfide, dipentanemethylenethiuram tetrasulfide, dipentamethylenethiuram tetrasulfide, and dipentamethylenethiuram hexasulfide.

Examples of the peroxide vulcanizing agent include tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy)hexane, benzoyl peroxide, and tert-butyl peroxybenzoate.

Examples of the resin vulcanizing agent include alkylphenol formaldehyde resin or the like.

Examples of the quinone dioxime vulcanizing agent include p-quinone dioxime, and p-p'-dibenozylquinone dioxime.

Examples of a vulcanizing accelerator, a vulcanization retardant, a vulcanization acceleration auxiliary and a crosslinking auxiliary together with the sulfur-containing vulcanizing agent, peroxide vulcanizing agent, resin vulcanizing agent, or quinone dioxime vulcanizing agent include various vulcanizing accelerators such as aldehyde ammonia accelerators, aldehyde amine accelerators, thiourea accelerators, guanidine accelerators, thiazole accelerators, sulfenamide accelerators, thiuram accelerators, dithiocarabamic acid salt accelerators, xanthogenic acid salt accelerators and the like; vulcanization retardants such as N-nitrosodiphenylamine, phthalic anhydride, N-chclohexylthiophathalimide and the like; vulcanization acceleration auxiliaries such as zinc flower, stearic acid, zinc stearate and the like; or various crosslinking auxiliaries such as quinone dioxime crosslinking auxiliaries, methacrylate crosslinking auxiliaries, allyl crosslinking auxiliaries, maleimide crosslinking auxiliaries and the like.

The blend amount of the vulcanizing accelerator, the vulcanization retardant, the vulcanization acceleration auxiliary, and the crosslinking auxiliary used together with the sulfur-containing vulcanizing agent, peroxide vulcanizing agent, resin vulcanizing agent, or quinone dioxime vulcanizing agent is preferably from 0 to 10 parts by weight, more preferably from 0.1 to 5 parts by weight for 100 parts by weight of the rubber component.

When the epichlorohydrin rubber is used as the rubber (a), the vulcanizing agent (e) is preferably at least one vulcanizing agent selected from the group consisting of thiourea vulcanizing agents, quinoxaline vulcanizing agents, sulfur-containing vulcanizing agents, peroxide vulcanizing agents, mercaptotriazine vulcanizing agents, and bisphenol vulcanizing agents and is more preferably at least one vulcanizing agent selected from the group consisting of thiourea vulcanizing agents, quinoxaline vulcanizing agents, and bisphenol vulcanizing agents. The vulcanizing agent (e) is in particular preferably any quinoxaline vulcanizing agent. These vulcanizing agents (e) may be used alone or in the form of a mixture of two or more thereof.

When the epichlorohydrin rubber is used as the rubber (a), the vulcanizing agent (e) is contained preferably in an amount of 0.1 to 10 parts by weight for 100 parts by weight of the epichlorohydrin rubber. The amount is more preferably from 0.5 to 5 parts by weight.

The composition of the present invention for vulcanizing adhesion comprises the compound (b), which is at least one compound selected from the group consisting of salts of 1,8-diazabicyclo(5.4.0)undecene-7, salts of 1,5-diazabicyclo(4.3.0)-nonene-5, 1,8-diazabicyclo(5.4.0)-undecene-7 and 1,5-diazabicyclo(4.3.0)-nonene-5.

Examples of the compound (b) include a p-toluenesulfonic acid salt of 1,8-diazabicyclo(5.4.0)undecene-7, a phenol salt of 1,8-diazabicyclo(5.4.0)undecene-7, a phenolic resin salt of 1,8-diazabicyclo(5.4.0)undecene-7, an orthophthalic acid salt of 1,8-diazabicyclo(5.4.0)undecene-7, a formic acid salt of 1,8-diazabicyclo(5.4.0)undecene-7, an octylic acid salt of 1,8-diazabicyclo(5.4.0)undecene-7, a carbonate of 1,8-diazabicyclo(5.4.0)undecene-7, a stearic acid salt of 1,8-diazabicyclo(5.4.0)undecene-7, a 2-ethylhexylic acid salt of 1,8-diazabicyclo(5.4.0)undecene-7, a benzoic acid salt of 1,8-diazabicyclo(5.4.0)undecene-7, a salicylic acid salt of 1,8-diazabicyclo(5.4.0)undecene-7, a 3-hydroxy-2-naphthoic acid salt of 1,8-diazabicyclo(5.4.0)undecene-7, a 2-mercaptobenzothiazole salt of 1,8-diazabicyclo(5.4.0)undecene-7, a 2-mercaptobenzimidazole salt of 1,8-diazabicyclo(5.4.0)undecene-7, a p-toluenesulfonic acid salt of 1,5-diazabicyclo(4.3.0)-nonene-5, a phenol salt of 1,5-diazabicyclo(4.3.0)-nonene-5, a phenolic resin salt of 1,5-diazabicyclo(4.3.0)-nonene-5, an orthophthalic acid salt of 1,5-diazabicyclo(4.3.0)-nonene-5, a formic acid salt of 1,5-diazabicyclo(4.3.0)-nonene-5, an octylic acid salt of 1,5-diazabicyclo(4.3.0)-nonene-5, a carbonate of 1,5-diazabicyclo(4.3.0)-nonene-5, a stearic acid salt of 1,5-diazabicyclo(4.3.0)-nonene-5, a 2-ethylhexylic acid salt of 1,5-diazabicyclo(4.3.0)-nonene-5, a benzoic acid salt of 1,5-diazabicyclo(4.3.0)-nonene-5, a salicylic acid salt of 1,5-diazabicyclo(4.3.0)-nonene-5, a 3-hydroxy-2-naphthoic acid salt of 1,5-diazabicyclo(4.3.0)-nonene-5, a 2-mercaptobenzothiazole salt of 1,5-diazabicyclo(4.3.0)-nonene-5, a 2-mercaptobenzimidazole salt of 1,5-diazabicyclo(4.3.0)-nonene-5, 1,8-diazabicyclo(5.4.0)undecene-7, and 1,5-diazabicyclo(4.3.0)-nonene-5.

The compound (b) is preferably at least one compound selected from the group consisting of a p-toluenesulfonic acid salt of 1,8-diazabicyclo(5.4.0)undecene-7, a phenol salt of 1,8-diazabicyclo(5.4.0)undecene-7, a phenolic resin salt of 1,8-diazabicyclo(5.4.0)undecene-7, an orthophthalic acid salt of 1,8-diazabicyclo(5.4.0)undecene-7, a formic acid salt of 1,8-diazabicyclo(5.4.0)undecene-7, an octylic acid salt of 1,8-diazabicyclo(5.4.0)undecene-7, a p-toluenesulfonic acid salt of 1,5-diazabicyclo(4.3.0)-nonene-5, a phenol salt of 1,5-diazabicyclo(4.3.0)-nonene-5, a phenolic resin salt of 1,5-diazabicyclo(4.3.0)-nonene-5, an orthophthalic acid salt of 1,5-diazabicyclo(4.3.0)-nonene-5, a formic acid salt of 1,5-diazabicyclo(4.3.0)-nonene-5, an octylic acid salt of 1,5-diazabicyclo(4.3.0)-nonene-5, 1,8-diazabicyclo(5.4.0)undecene-7, and 1,5-diazabicyclo(4.3.0)-nonene-5.

From the viewpoint of an improvement in the adhesiveness, the compound (b) is more preferably a phenolic salt of 1,8-diazabicyclo(5.4.0)undecene-7.

When the rubber (a) is at least one rubber selected from the group consisting of acrylonitrile butadiene rubber (NBR), hydrogenated NBR (H-NBR), acrylic rubber (ACM), ethylene acrylate rubber (AEM), fluorine-contained rubber (FKM), chloroprene rubber (CR), chlorosulfonated polyethylene (CSM), chlorinated polyethylene (CPE), and ethylene propylene rubbers (EPM and EPDM), the amount of the compound (b) is preferably from 0.1 to 10 parts by weight, more preferably from 0.3 to 3.0 parts by weight, in particular preferably from 0.5 to 1.5 parts by weight for 100 parts by weight of the rubber (a).

When the rubber (a) is the epichlorohydrin rubber, the amount of the compound (b) is preferably from 0.3 to 3.0 parts by weight, more preferably from 0.5 to 2.0 parts by weight, in particular preferably from 0.5 to 1.5 parts by weight for 100 parts by weight of the epichlorohydrin rubber (a).

The composition of the present invention for vulcanizing adhesion contains the water-carrying substance (c), which is at least one substance selected from water-absorbed substances and hydrated substances. The water-absorbed substances are each a compound in which water is absorbed and held and which is provided that the water is vaporized and released by heating the compound. The hydrated substances are each a compound having, in a structure thereof, water provided that water is generated and released by heating and decomposing the compound. The water-carrying substance (c) is preferably a water-absorbed substance in which a polyether compound absorbs water, a water-absorbed substance in which a metal compound or some other absorbs water, or a hydrated substance such as a metal salt hydrate and the like from the viewpoint of the handleability thereof. A metal salt hydrate is particularly preferred. When the composition contains the water-carrying substance (c), the composition can be improved in adhesiveness.

Examples of the water-absorbed substance(s) as the water-carrying substance (c) include a water-absorbed substance in which a polyether compound absorbs water, and water-absorbed substances in which a metal compound absorbs water. The absorption of each of the compounds is attained by the contact thereof with water (for example, the immersion thereof into water), and is not particularly limited.

Examples of the polyether compound include polyethylene oxide, polyethylene glycol or the like.

Examples of the metal compound include oxides, hydroxides, carbonates, sulfates and silicates of metals, synthetic hydrotalcite or the like.

Examples of the metal hydroxides include aluminum hydroxide, magnesium hydroxide, calcium hydroxide, barium hydroxide, zinc hydroxide, iron hydroxide, copper hydroxide, manganese hydroxide or the like.

Examples of the metal oxides include aluminum oxide, calcium oxide, magnesium oxide, titanium oxide or the like.

Examples of the metal carbonates include aluminum carbonate, calcium carbonate, magnesium carbonate, barium carbonate or the like.

Examples of the metal sulfates include calcium sulfate, barium sulfate, aluminum sulfate or the like.

Examples of the metal silicates include aluminum silicate, calcium silicate, magnesium silicate, aluminum silicate, sodium silicate or the like.

In order to improve the composition in adhesiveness, the water-absorbed substance of the water-carrying substance (c) is preferably a compound having an absorbed water hold ratio of 5% by weight or more. The water-absorbed substance is more preferably a compound having an absorbed water hold ratio of 10% by weight or more. The absorbed water hold ratio is the proportion of water held by the water-absorbed substance, and is calculated in accordance with the following:
Water-absorbed hold ratio (% by weight)=(amount (weight) of water held by the water-absorbed substance/water-absorbed substance (weight))×100

The hydrated substance of the water-carrying substance (c) may be a metal salt hydrate.

Examples of the metal salt hydrate include hydrates of inorganic acid salts, such as silicic acid, boric acid, phosphoric acid, sulfuric acid, nitric acid, carbonic acid and the like of a metal such as aluminum, calcium, zinc, manganese, lanthanum, titanium, zirconium, iron, cobalt, nickel, magnesium, cupper and the like; and hydrates of salts of organic acid, such as carboxylic acids such as benzoic acid, phthalic acid, maleic acid, succinic acid, salicylic acid, citric acid and the like. The metal salt hydrate is preferably a hydrate of a metal salt selected from calcium acetate, aluminum sulfate, calcium sulfate, zinc sulfate, manganese sulfate, lanthanum sulfate, titanium sulfate, zirconium sulfate, iron sulfate, cobalt sulfate, magnesium sulfate and nickel sulfate. The metal salt hydrate is preferably a hydrate of a sulfate and/or an acetate of a metal selected from calcium, magnesium, sodium and copper. The hydrate is more preferably calcium sulfate dihydrate, sodium sulfate decahydrate, or copper (II) sulfate pentahydrate. The hydrate is in particular preferably calcium sulfate dihydrate and sodium sulfate decahydrate.

The blend amount of the water-carrying substance (c) is from 0.1 to 80 parts by weight, preferably from 0.5 to 70 parts by weight, more preferably from 1 to 50 parts by weight, in particular preferably from 1 to 20 parts by weight for 100 parts by weight of the rubber (a). When the amount is in the range, a sufficient adhesion effect is favorably obtained without damaging mechanical properties of the vulcanized product.

The composition of the present invention for adhesion contains, as essential components, the rubber (a), the compound (b), and the water-carrying substance (c), and may contain, as an optional component, an epoxy resin (d).

The epoxy resin (d) is preferably, for example, at least one selected from the group consisting of bisphenol A type epoxy resin, bisphenol F type epoxy resin, phenol novolak type epoxy resin, o-cresol novolak type epoxy resin, amine type epoxy resin, hydrogenated bisphenol A type epoxy resin, and polyfunctional epoxy resin. Of these examples, bisphenol A type epoxy resin is preferred since the resin is good in chemical resistance and adhesiveness. Furthermore, an epoxy resin represented by the following formula (1) is particularly used:

[Formula 1]

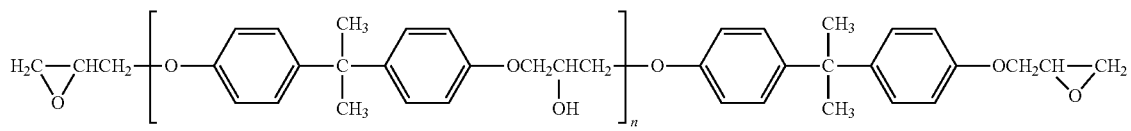

(1)

In the formula (1), n is a value of the average, and is preferably from 0.1 to 3, more preferably from 0.1 to 0.5, even more preferably from 0.1 to 0.3.

The amount of the epoxy resin (d) is preferably from 0.1 to 5 parts by weight, more preferably from 0.3 to 3 parts by weight for 100 parts by weight of the rubber (a).

A preferred embodiment of the composition of the present invention for vulcanizing adhesion is an embodiment in which the total amount of the compound (b) and the epoxy resin (d) is more than 2.0 parts by weight for 100 parts by weight of the rubber (a).

The composition of the present invention for vulcanizing adhesion may further contain a resin other than epoxy resin to give a property different from that of the rubber (a) thereto. Examples of the resin include polymethyl methacrylate (PMMA) resin, polystyrene (PS) resin, polyurethane (PUR) resin, polyvinyl chloride (PVC) resin, ethylene/vinyl acetate (EVA) resin, styrene/acrylonitrile (AS) resin, and polyethylene (PE) resin. In this case, the blend amount of the resin is preferably from 1 to 50 parts by weight for 100 parts by weight of the (a).

In accordance with purpose or need, ordinary additives blendable into ordinary rubber compositions for vulcanization may be blended into the present invention as far the advantageous effects of the present invention are not damaged, examples thereof including a filler, a working auxiliary, a plasticizer, an acid-receiving agent, a softener, an anti-aging agent, a colorant, a stabilizer, an adhesive auxiliary, a releasing agent, an electric conductive agent, a thermal conductive agent, a surface non-adhesive agent, an adhesive, a flexibilizer, a heat resistance improver, a flame retardant, an ultraviolet absorber, an oil resistance improver, a foaming agent, a scorch preventive, a lubricant, and various other additives. Ordinary vulcanizing agents and vulcanizing accelerators different from those described above may be blended thereinto alone or in combination of two or more thereof.

Examples of the filler include metal sulfides such as molybdenum disulfide, iron sulfide and copper sulfide, diatomaceous earth, asbestos, lithopone (zinc sulfide/barium sulfide), graphite, carbon black, carbon fluoride, calcium fluoride, coke, fine quartz particles, talc, clay, mica powder, wollastonite, carbon fiber, aramide fiber, various whiskers, glass fiber, organic reinforcing agents, organic fillers and the like.

Examples of the working auxiliary include higher aliphatic acids such as stearic acid, oleic acid, palmitic acid, lauric acid and the like; higher aliphatic acid salts such as sodium stearate, zinc stearate and the like; higher aliphatic acid amides such as stearic amide, oleic amide and the like; higher aliphatic acid esters such as ethyl oleate and the like; higher aliphatic amines such as stearylamine, oleylamine and the like; petroleum waxes such as carnauba wax, ceresin wax and the like; polyglycols such as ethylene glycol, glycerin, diethylene glycol and the like; aliphatic hydrocarbons such as Vaseline, paraffin and the like; and silicone oils, silicone polymers, low molecular weight polyethylene, phthalic acid esters, phosphoric acid esters, rosin, (halogenated) dialkylamines, (halogenated) dialkylsulfones, surfactants and the like.

Examples of the plasticizer include phthalic acid derivatives, and sebacic acid derivatives; examples of the softener, lubricant oils, process oil, coal tar, castor oil, and calcium stearate; and examples of the anti-aging agent, phenylenediamines, phosphates, quinolines, cresols, phenols, dithiocarbamate metal salts and the like.

The composition of the present invention for vulcanizing adhesion is prepared by mixing the rubber (a), the compound (b), and the water-carrying substance (c) with each other, and optionally mixing the epoxy resin (d) and the other additives further therewith.

The mixing and kneading may be attained, using, for example, an open roll, a Banbury mixer, a pressurizing kneader or the like at a temperature of 100° C. or lower.

A vulcanized product in which the composition of the present invention for vulcanizing adhesion is vulcanized is obtained by heating the composition for vulcanizing adhesion usually to 100 to 200° C. The vulcanizing period, which is varied in accordance with the temperature, is usually from 0.5 to 300 minutes. The method for vulcanizing/shaping the composition may be any method, such as compression molding using a mold, injection molding, or heating using an air bath, infrared rays or microwaves.

An embodiment of the present invention is, for example, a vulcanized rubber laminated body in which a layer of the rubber composition and a layer of a different polymer composition are bonded to each other by heating/vulcanizing the composition layers.

In a case where the different polymer layer and the rubber layer are laminated onto each other, chemically strong adhesion is obtained therebetween at the time of the vulcanization without conducting any especial complicated step. It is therefore possible to provide a vulcanized rubber laminated body having a sufficient adhesive force even when the laminated body is exposed to sever conditions (for example, the laminated body is immersed into a fuel oil). About the shapability, these compositions are shapable at low costs, and are easily shaped. Additionally, the layers can be shaped by an ordinary method such as extrusion molding, so that the laminate can be made into a thin film, and is further improved in flexibility.

On the basis of the above-mentioned findings, the present invention has been achieved, and provides the following laminate bodies each using the composition for vulcanizing adhesion.

Item 1. A laminated body using a composition for vulcanizing adhesion comprising a rubber (a), at least one compound (b) selected from the group consisting of salts of 1,8-diazabicyclo(5.4.0) undecene-7, salts of 1,5-diazabicyclo (4.3.0)-nonene-5, 1,8-diazabicyclo(5.4.0) undecene-7 and 1,5-diazabicyclo(4.3.0)-nonene-5, and at least one water-carrying substance (c) selected from water-absorbed substances and hydrated substances.

Item 2. The laminated body according to item 1, wherein the rubber composition for vulcanization further comprises an epoxy resin (d).

Item 3. The laminated body according to item 1 or 2, wherein the water-carrying substance (c) is a water-absorbed substance in which a polyether compound absorbs water, a water-absorbed substance in which a metal compound absorbs water, and/or a metal salt hydrate.

Item 4. The laminated body according to any one of items 1 to 3, wherein the rubber (a) is at least one rubber selected from the group consisting of acrylonitrile butadiene rubber (NBR), hydrogenated NBR (H-NBR), acrylic rubber (ACM), ethylene acrylate rubber (AEM), fluorine-contained rubber (FKM), chloroprene rubber (CR), chlorosulfonated polyethylene (CSM), chlorinated polyethylene (CPE), and ethylene propylene rubbers (EPM and EPDM).

Item 5. The laminated body according to any one of items 1 to 4, wherein the compound (b) is a least one compound selected from the group consisting of a p-toluenesulfonic acid salt of 1,8-diazabicyclo(5.4.0) undecene-7, a phenol salt of 1,8-diazabicyclo(5.4.0) undecene-7, a phenolic resin salt of 1,8-diazabicyclo(5.4.0) undecene-7, an orthophthalic acid salt of 1,8-diazabicyclo(5.4.0) undecene-7, a formic acid salt of 1,8-diazabicyclo(5.4.0) undecene-7, an octylic acid salt of 1,8-diazabicyclo(5.4.0) undecene-7, a p-toluenesulfonic acid salt of 1,5-diazabicyclo(4.3.0)-nonene-5, a phenol salt of 1,5-diazabicyclo(4.3.0)-nonene-5, a phenolic resin salt of 1,5-diazabicyclo(4.3.0)-nonene-5, an orthophthalic acid salt of 1,5-diazabicyclo(4.3.0)-nonene-5, a formic acid salt of 1,5-diazabicyclo(4.3.0)-nonene-5, an octylic acid salt of 1,5-diazabicyclo(4.3.0)-nonene-5, 1,8-diazabicyclo(5.4.0) undecene-7, and 1,5-diazabicyclo(4.3.0)-nonene-5.

Item 6. The laminated body according to any one of items 1 to 5, wherein the amount of the compound (b) is from 0.1 to 10 parts by weight for 100 parts by weight of the rubber (a).

Item 7. The laminated body according to any one of items 1 to 3, comprising a rubber layer (A), and a layer (B) of a fluorine-contained polymer (other than any fluorine-contained polymer having a copolymerization unit originating from chlorotrifluoroethylene) that is laminated over the rubber layer (A), wherein the rubber layer (A) is a layer made of the rubber composition for vulcanization, the rubber (a) is epichlorohydrin rubber, and a vulcanizing agent (e) is further comprised.

Item 8. The laminated body according to item 7, wherein the vulcanizing agent (e) comprises at least one vulcanizing agent selected from the group consisting of quinoxaline vulcanizing agents, thiourea vulcanizing agents, mercaptotriazine vulcanizing agents, bisphenol vulcanizing agents, sulfur-containing vulcanizing agents, and peroxide vulcanizing agents.

Item 9. The laminated body according to item 7 or 8, wherein the epichlorohydrin rubber is a polymer having a polymerization unit based on epichlorohydrin, and a polymerization unit based on ethylene oxide.

Item 10. The laminated body according to any one of items 7 to 9, wherein the epichlorohydrin rubber is a polymer having a polymerization unit based on epichlorohydrin, a polymerization unit based on ethylene oxide, and a polymerization unit based on ally glycidyl ether.

Item 11. The laminated body according to any one of items 7 to 10, wherein the amount of the compound (b) is from 0.5 to 3.0 parts by weight for 100 parts by weight of the epichlorohydrin rubber.

Item 12. The laminated body according to any one of items 7 to 11, wherein about the fluorine-contained polymer (other than any fluorine-contained polymer having a copolymerization unit originating from chlorotrifluoroethylene) layer (B), the fluorine-contained polymer used therein is a polymer having at least one polymerization unit selected from a polymerization unit based on vinylidene fluoride, a polymerization unit based on hexafluoropropene, a polymerization unit based on tetrafluoroethylene, and a polymerization unit based on perfluoroalkyl vinyl ether.

Item 13. The laminated body according to any one of items 7 to 12, wherein about the fluorine-contained polymer (other than any fluorine-contained polymer having a copolymerization unit originating from chlorotrifluoroethylene) layer (B), the fluorine-contained polymer used therein is at least one polymer selected from the group consisting of vinylidenefluoride/hexafluoropropene binary copolymer, tetrafluoroethylene/hexafluoropropene binary copolymer, vinylidenefluoride/hexafluoropropene/tetrafluoroethylene terpolymer, vinylidenefluoride/perfluoroalkyl vinyl ether/tetrafluoroethylene terpolymer, tetrafluoroethylene/perfluoroethyl vinyl ether copolymer, tetrafluoroethylene/perfluoropropyl vinyl ether copolymer, tetrafluoroethylene/propylene binary copolymer, vinylidenefluoride/tetrafluoroethylene/tetrafluoroethylene terpolymer, ethylene/tetrafluoroethylene binary copolymer, polyvinylidene fluoride, and polytetrafluoroethylene.

When the rubber (a) is at least one rubber selected from the group consisting of acrylonitrile butadiene rubber (NBR), hydrogenated NBR (H-NBR), acrylic rubber (ACM), ethylene acrylate rubber (AEM), fluorine-contained rubber (FKM), chloroprene rubber (CR), chlorosulfonated polyethylene (CSM), chlorinated polyethylene (CPE), and ethylene propylene rubbers (EPM and EPDM), a polymer layer which is to be subjected to heating/vulcanizing adhesion onto the composition for vulcanizing adhesion is, for example, a low-gas-permeability polymer layer. The low gas permeability polymer layer is preferably a fluorine-contained polymer layer.

Examples of a polymer used in the low gas permeability polymer layer include vinylidenefluoride/hexafluoropropene binary copolymer, tetrafluoroethylene/hexafluoropropene binary copolymer, vinylidenefluoride/hexafluoropropene/tetrafluoroethylene terpolymer, vinylidenefluoride/perfluoroalkyl vinyl ether/tetrafluoroethylene terpolymer, tetrafluoroethylene/perfluoroethyl vinyl ether copolymer, tetrafluoroethylene/perfluoropropyl vinyl ether copolymer, tetrafluoroethylene/perfluoroalkyl vinyl ether/chlorotrifluoro terpolymer, tetrafluoroethylene/propylene binary copolymer, vinylidenefluoride/tetrafluoroethylene/tetrafluoroethylene terpolymer, ethylene/tetrafluoroethylene binary copolymer, polyvinylidene fluoride, polytetrafluoroethylene, polyvinylidene chloride resin, polyvinyl alcohol resin, ethylene/vinyl alcohol copolymer resin, nylon resin, polyacrylonitrile resin, polyester resin and the like. The polymer is preferably vinylidenefluoride/hexafluoropropene copolymer, tetrafluoroethylene/hexafluoropropene binary copolymer, vinylidenefluoride/hexafluoropropene/tetrafluoroethylene terpolymer, vinylidenefluoride/perfluoroalkyl vinyl ether/tetrafluoroethylene terpolymer, tetrafluoroethylene/perfluoroethyl vinyl ether copolymer, tetrafluoroethylene/perfluoropropyl vinyl ether copolymer, tetrafluoroethylene/perfluoroalkyl vinyl ether/chlorotrifluoro terpolymer, tetrafluoroethylene/propylene binary copolymer, vinylidenefluoride/tetrafluoroethylene/tetrafluoroethylene terpolymer, ethylene/tetrafluoroethylene binary copolymer, polyvinylidene fluoride, or polytetrafluoroethylene.

In accordance with purpose, known compounding agents are added to the polymer layer to be subjected to heating/vulcanizing adhesion onto the composition for vulcanizing adhesion, examples of the agents including a crosslinking agent (vulcanizing agent), a vulcanizing accelerator, a stabilizer, a colorant, a plasticizer, a reinforcing agent or the like.

The method for producing the laminated body may be a method of laminating the two compositions onto each other by co-extrusion molding or sequential extrusion molding, and next heating/vulcanizing the laminated body through vapor, or heating/vulcanizing/shaping the laminated body through vapor. The method may be a method of heating/vulcanizing one of the rubber compositions weakly into such a degree that the shape thereof is not broken, laminating the two onto each other, and heating/vulcanizing/shaping the laminated body sufficiently through vapor. A means other than the above-mentioned vapor-heating/vulcanizing of the laminated body, which has been subjected to the laminating by the extrusion molding, may a known means such as mold-heating, an air bath, infrared rays, microwaves, lead-covering vulcanization and the like. Such a known means may be adopted at will. In the vulcanization, the heating temperature is usually from 100 to 200° C., and the heating period, which is varied in accordance with the temperature, is selected from the range of 0.5 to 300 minutes.

When the rubber (a) is epichlorohydrin rubber, the laminated body has: a rubber layer (A) comprising a composition for vulcanizing adhesion comprising the epichlorohydrin rubber (a), at least one compound (b) selected from the group consisting of salts of 1,8-diazabicyclo(5.4.0) undecene-7, salts of 1,5-diazabicyclo(4.3.0)-nonene-5, 1,8-diazabicyclo(5.4.0) undecene-7 and 1,5-diazabicyclo(4.3.0)-nonene-5, at least one water-carrying substance (c) selected from water-absorbed substances and hydrated substances, and a vulcanizing agent (e); and a fluorine-contained polymer layer (B) laminated over the rubber layer (A).

Hereinafter, each of the layers will be described.

(A) Rubber Layer

The rubber layer (A) is a layer comprising a rubber composition for vulcanization.

The epichlorohydrin rubber (a) is not particularly limited as far as the rubber is an unvulcanized rubber having a polymerization unit based on epichlorohydrin. The epichlorohydrin rubber (a) may be a unary polymer made substantially of only a polymerization unit based on epichlorohydrin, or may be a binary or higher polymer made of a polymerization unit based on epichlorohydrin and a polymerization unit based on a monomer other than epichlorohydrin.

The monomer other than epichlorohydrin is preferably, for example, at least one monomer selected from the group consisting of ethylene oxide, propylene oxide, and allyl glycidyl ether. The rubber composition for vulcanization is preferably a polymer having a polymerization unit based on epichlorohydrin and a polymerization unit based on ethylene oxide, and is more preferably a polymer having a polymerization unit based on epichlorohydrin, a polymerization unit based on ethylene oxide, and a polymerization unit based on allyl glycidyl ether.

The epichlorohydrin rubber (a) is preferably at least one polymer selected from the group consisting of epichlorohydrin homopolymer, epichlorohydrin/ethylene oxide copolymer, epichlorohydrin/allyl glycidyl ether copolymer, epichlorohydrin/ethylene oxide/ally glycidyl ether copolymer, epichlorohydrin/propylene oxide copolymer, epichlorohydrin/propylene oxide/ally glycidyl ether copolymer, and epichlorohydrin/ethylene oxide/propylene oxide/ally glycidyl ether quaternary polymer. The epichlorohydrin rubber (a) is more preferably at least one polymer selected from the group consisting of epichlorohydrin/ethylene oxide copolymer, and epichlorohydrin/ethylene oxide/ally glycidyl ether copolymer. These may be used alone or in the form of a mixture of two or more thereof.

The rubber composition for vulcanization contains the vulcanizing agent (e). The vulcanizing agent may be a vulcanizing agent known conventionally which matches with a vulcanizing system of the rubber composition for vulcanization. By vulcanizing the epichlorohydrin rubber (a), the resultant vulcanized rubber layer is improved in mechanical strength such as tensile strength, and further the layer can gain a good elasticity.

Examples of the vulcanizing agent (e) include known vulcanizing agents using the reactivity of a chlorine atom, such as polyamine vulcanizing agents, thiourea vulcanizing agents, thiadiazole vulcanizing agents, mercaptotriazine vulcanizing agents, pyrazine vulcanizing agents, quinoxaline vulcanizing agents, bisphenol vulcanizing agents and the like.

Examples of the known vulcanizing agents (e) using the reactivity of a chlorine atom are given; examples of the polyamine vulcanizing agents include ethylenediamine, hexamethylenediamine, diethylenetriamine, triethylenetetramine, hexamethylenetetramine, p-phenylenediamine, cumenediamine, N,N'-dicinnamylidene-1,6-hexadiamine, ethylenediamine carbamate, hexamethylenediamine carbamate and the like.

Examples of the thiourea vulcanizing agents include ethylenethiourea, 1,3-diethylthiourea, 1,3-dibutylthiourea, trimethylthiourea and the like.

Examples of the thiadiazole vulcanizing agents include 2,5-dimercapto-1,3,4-thiadiazole, 2-mercapto-1,3,4-thiadiazole-5-thiobenzoate and the like.

Examples of the mercaptotriazine vulcanizing agents include 2,4,6-trimercapto-1,3,5-triazine, 2-methoxy-4,6-dimercaptotriazine, 2-hexylamino-4,6-dimercaptotriazine, 2-diethylamino-4,6-dimercaptotriazine, 2-cyclohexaneamino-4,6-dimercaptotriazine, 2-dibutylamino-4,6-dimercaptotriazine, 2-anilino-4,6-dimercaptotriazine, 2-phenylamino-4,6-dimercaptotriazine and the like.

Examples of the pyrazine vulcanizing agents include 2,3-dimercaptopyrazine derivatives and the like. Examples of the 2,3-dimercaptopyrazine derivatives include pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, 5,6-dimethylpyrazine-2,3-dithiocarbonate and the like.

Examples of the quinoxaline vulcanizing agents include 2,3-dimercaptoquinoxaline derivatives and the like. Examples of the 2,3-dimercaptoquinoxaline derivatives include quinoxaline-2,3-dithiocarbonate, 6-methylquinoxaline-2,3-dithiocarbonate, 6-ethyl-2,3-dimercaptoquinoxaline, 6-isopropylquinoxaline-2,3-dithiocarbonate, and 5,8-dimethylquinoxaline-2,3-dithiocarbonate.

Examples of the bisphenol vulcanizing agents include 4,4'-dihydroxydiphenylsulfoxide, 4,4'-dihydroxydiphenylsulfone (bisphenol S), 1,1-cyclohexylidene-bis(4-hydroxybenzene), 2-chloro-1,4-cyclohexylene-bis(4-hydroxybenzene), 2,2-isopropylidene-bis(4-hydroxybenzene) (bisphenol A), hexafluoroisopropylidene-bis(4-hydroxybenzene) (bisphenol AF), 2-fluoro-1,4-phenylene-bis(4-hydroxybenzene) and the like.

In the rubber composition for vulcanization, a known vulcanizing accelerator and retardant may be used, as they are, together the vulcanizing agent (e) in the present invention. The vulcanizing accelerator used together with the known vulcanizing agent using the reactivity of a chlorine atom include primary, secondary and tertiary amines, organic acid salts or adducts of the amines, guanidine type accelerators, thiuram type accelerators, dithiocarbamic acid type accelerators and the like. Examples of the retardant include N-cyclohexanethiophthalimide, zinc salts of dithiocarbamic acids and the like.

Examples of the vulcanizing accelerator are given; particularly preferred examples of the primary, secondary and tertiary amines include primary, secondary and tertiary amines each made from an aliphatic or cyclic aliphatic acid having 5 to 20 carbon atoms. Typical examples of these amines include n-hexylamine, octylamine, dibutylamine, tributyl amine, hexamethylenediamine and the like.

Examples of an organic acid to be combined with any one of the amines to form a salt include carboxylic acids, carbamic acids, 2-mercaptobenzothiazole, dithiophosphoric acid and the like. Examples of a substance to be combined with any one of the amines to form an adduct include alcohols, oximes and the like. Specific examples of the organic acid salts or the adducts of the amines include a n-butylamine/acetate salt, a hexamethylenediamine/carbamate salt, a dicyclohexylamine salt of 2-mercaptobenzothiazole and the like.

Examples of the guanidine type accelerators include diphenylguanidine, ditolylguanidine and the like.

Examples of the thiuram type accelerators include tetramethylthiuram disulfide, tetramethylthiuram monosulfide, tetraethylthiuram disulfide, tetrabutylthiuram disulfide, dipentamethylenethiuram tetrasulfide and the like.

Examples of the dithiocarbamic acid type accelerators include a piperidine salt of pentamethylenedithiocarbamate and the like.

The blend amount of the vulcanizing accelerator or retardant used together with the known vulcanizing agent using the reactivity of a chlorine atom is preferably from 0 to 10 parts by weight, more preferably from 0.1 to 5 parts by weight for 100 parts by weight of the rubber component.

When the epichlorohydrin rubber (a) is a polymer having a double bond, such as epichlorohydrin/ally glycidyl ether copolymer, or epichlorohydrin/ethylene oxide/ally glycidyl ether terpolymer, for example, the following may be used: a known vulcanizing agent used ordinarily to vulcanize nitrile rubbers, such as a sulfur-containing vulcanizing agent, a peroxide vulcanizing agent, a resin vulcanizing agent, a quinone dioxime vulcanizing agent and the like.

Examples of the sulfur-containing vulcanizing agent include sulfur, morpholine disulfide, tetramethylthiuram disulfide, tetraethylthiuram disulfide, tetrabutylthiuram disulfide, N,N'-dimethyl-N,N'-diphenylthiuram disulfide, dipentanemethylenethiuram tetrasulfide, dipentamethylenethiuram tetrasulfide, and dipentamethylenethiuram hexasulfide.

Examples of the peroxide vulcanizing agent include tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy)hexane, benzoyl peroxide, and tert-butyl peroxybenzoate.

Examples of the resin vulcanizing agent include alkylphenol formaldehyde resin and the like.

Examples of the quinone dioxime vulcanizing agent include p-quinone dioxime, and p-p'-dibenozylquinone dioxime.

Examples of a vulcanizing accelerator, a vulcanization retardant, a vulcanizing accelerator auxiliary, and a crosslinking auxiliary used together with the sulfur-containing vulcanizing agent, peroxide vulcanizing agent, resin vulcanizing agent, or quinone dioxime vulcanizing agent include various vulcanizing accelerators such as aldehyde ammonia accelerators, aldehyde amine accelerators, thiourea accelerators, guanidine accelerators, thioazole accelerators, sulfeneamide accelerators, thiuram accelerators, dithiocarbomic acid salt accelerators, xanthogenic acid salt accelerators and the like; vulcanization retardants such as N-nitrosodiphenylamine, phthalic anhydride, N-cyclohexylthiophtalimide and the like; vulcanization acceleration auxiliaries such as zinc flower and the like, stearic acid, and zinc stearate; and various crosslinking auxiliaries such as quinone dioxime crosslinking auxiliaries, methacrylate crosslinking auxiliaries, allyl crosslinking auxiliaries, maleimide crosslinking auxiliaries and the like.

The blend amount of the vulcanizing accelerator, the vulcanization retardant, the vulcanization acceleration auxiliary, and the crosslinking auxiliary used together with the sulfur-containing vulcanizing agent, peroxide vulcanizing agent, resin vulcanizing agent, or quinone dioxime vulcanizing agent is preferably from 0 to 10 parts by weight, more preferably from 0.1 to 5 parts by weight for 100 parts by weight of the rubber component.

From the viewpoint of the heat resistance of the epichlorohydrin rubber (a) and the adhesiveness between the rubber layer (A) and the fluorine-contained polymer layer (B), the vulcanizing agent is preferably at least one vulcanizing agent (e) selected from the group consisting of thiourea vulcanizing agents, quinoxaline vulcanizing agents, sulfur-containing vulcanizing agents, peroxide vulcanizing agents, mercaptotriazine vulcanizing agents, and bisphenol vulcanizing agents, and is more preferably at least one vulcanizing agent selected from the group consisting of thiourea vulcanizing agents, quinoxaline vulcanizing agents, and bisphenol vulcanizing agents, and is in particular preferably any quinoxaline vulcanizing agent. These vulcanizing agents may be used alone or in the form of a mixture of two or more thereof.

The vulcanizing agent (e) is contained preferably in an amount of 0.1 to 10 parts by weight for 100 parts by weight of the epichlorohydrin rubber (a). The amount is more preferably from 0.5 to 5 parts by weight. If the amount of the vulcanizing agent is less than 0.1 parts by weight, the crosslinking effect may unfavorably become insufficient. If the amount is more than 10 parts by weight, a shaped body obtained by shaping the laminated body of the present invention becomes too rigid so that the shaped body may not unfavorably gain a practical rubber property.

The rubber composition for vulcanization contains the water-carrying substance (c), which is at least one substance selected from water-absorbed substances and hydrated substances. The water-absorbed substances are each a compound in which water is absorbed and held and which is provided that the water is vaporized and released by heating the compound. The hydrated substances are each a compound having, in a structure thereof, water provided that water is generated and released by heating and decomposing the compound. The water-carrying substance (c) is preferably a water-absorbed substance in which a polyether compound absorbs water, a water-absorbed substance in which a metal compound or some other absorbs water, or a hydrated substance such as a metal salt hydrate from the viewpoint of the handleability thereof. A metal salt hydrate is particularly preferred. When the composition contains the water-carrying substance (c), the composition can be improved in adhesiveness.

Examples of the water-absorbed substance(s) as the water-carrying substance (c) include a water-absorbed substance in which a polyether compound absorbs water, and water-absorbed substances in which a metal compound absorbs water. The absorption of each of the compounds is attained by the contact thereof with water (for example, the immersion thereof into water), and is not particularly limited.

Examples of the polyether compound include polyethylene oxide polyethylene glycol or the like.

Examples of the metal compound include oxides, hydroxides, carbonates, sulfates and silicates of metals, synthetic hydrotalcite or the like.

Examples of the metal hydroxides include aluminum hydroxide, magnesium hydroxide, calcium hydroxide, barium hydroxide, zinc hydroxide, iron hydroxide, copper hydroxide, manganese hydroxide or the like.

Examples of the metal oxides include aluminum oxide, calcium oxide, magnesium oxide, titanium oxide or the like.

Examples of the metal carbonates include aluminum carbonate, calcium carbonate, magnesium carbonate, barium carbonate or the like.

Examples of the metal sulfates include calcium sulfate, barium sulfate, aluminum sulfate or the like.

Examples of the metal silicates include aluminum silicate, calcium silicate, magnesium silicate, aluminum silicate, sodium silicate or the like.

In order to improve the composition in adhesiveness, the water-absorbed substance of the water-carrying substance (c) is preferably a compound having an absorbed water hold ratio of 5% or more. The water-absorbed substance is more preferably a compound having an absorbed water hold ratio of 10% or more. The absorbed water hold ratio is the proportion of water held by the water-absorbed substance, and is calculated in accordance with the following:

Water-absorbed hold ratio(% by weight)=(amount (weight)of water held by the water-absorbed substance/water-absorbed substance(weight))×100

The hydrated substance of the water-carrying substance (c) may be a metal salt hydrate.

Examples of the metal salt hydrate include hydrates of inorganic acid salts, such as silicic acid, boric acid, phosphoric acid, sulfuric acid, nitric acid carbonic acid and the like of a metal such as aluminum, calcium, zinc, manganese, lanthanum, titanium, zirconium, iron, cobalt, nickel, magnesium, cupper and the like; and hydrates of salts of organic acid, such as carboxylic acids such as benzoic acid, phthalic acid, maleic acid, succinic acid, salicylic acid, and citric acid. The metal salt hydrate is preferably a hydrate of a metal salt selected from calcium acetate, aluminum sulfate, calcium sulfate, zinc sulfate, manganese sulfate, lanthanum sulfate, titanium sulfate, zirconium sulfate, iron sulfate, cobalt sulfate, magnesium sulfate and nickel sulfate. The metal salt hydrate is preferably a hydrate of a sulfate and/or an acetate of a metal selected from calcium, magnesium, sodium and copper. The hydrate is more preferably calcium sulfate dihydrate, sodium sulfate decahydrate, or copper (II) sulfate pentahydrate. The hydrate is in particular preferably calcium sulfate dihydrate and sodium sulfate decahydrate.

The blend amount of the water-carrying substance (c) is from 0.1 to 80 parts by weight, preferably from 0.5 to 70 parts by weight, more preferably from 1 to 50 parts by weight, in particular preferably from 1 to 20 parts by weight for 100 parts by weight of the epichlorohydrin rubber (a). When the amount is in the range, a sufficient adhesion effect is favorably obtained without damaging mechanical properties of the vulcanized product.

The rubber composition for vulcanization contains the compounds (b), which is at least one compound selected from the group consisting of salts of 1,8-diazabicyclo(5.4.0) undecene-7, salts of 1,5-diazabicyclo(4.3.0)-nonene-5, 1,8-diazabicyclo(5.4.0) undecene-7 and 1,5-diazabicyclo(4.3.0)-nonene-5, thus making it possible to be improved in vulcanization property so as to be improved in adhesiveness.

Examples of the compound (b) include a p-toluenesulfonic acid salt of 1,8-diazabicyclo(5.4.0) undecene-7, a phenol salt of 1,8-diazabicyclo(5.4.0) undecene-7, a phenolic resin salt of 1,8-diazabicyclo(5.4.0) undecene-7, an orthophthalic acid salt of 1,8-diazabicyclo(5.4.0) undecene-7, a formic acid salt of 1,8-diazabicyclo(5.4.0) undecene-7, an octylic acid salt of 1,8-diazabicyclo(5.4.0) undecene-7, a carbonate of 1,8-diazabicyclo(5.4.0) undecene-7, a stearic acid salt of 1,8-diazabicyclo(5.4.0) undecene-7, a 2-ethylhexylic acid salt of 1,8-diazabicyclo(5.4.0) undecene-7, a benzoic acid salt of 1,8-diazabicyclo(5.4.0) undecene-7, a salicylic acid salt of 1,8-diazabicyclo(5.4.0) undecene-7, a 3-hydroxy-2-naphthoic acid salt of 1,8-diazabicyclo(5.4.0) undecene-7, a 2-mercaptobenzothiazole salt of 1,8-diazabicyclo(5.4.0) undecene-7, a 2-mercaptobenzimidazole salt of 1,8-diazabicyclo(5.4.0) undecene-7, a p-toluenesulfonic acid salt of 1,5-diazabicyclo(4.3.0)-nonene-5, a phenol salt of 1,5-diazabicyclo(4.3.0)-nonene-5, a phenolic resin salt of 1,5-diazabicyclo(4.3.0)-nonene-5, an orthophthalic acid salt of 1,5-diazabicyclo(4.3.0)-nonene-5, a formic acid salt of 1,5-diazabicyclo(4.3.0)-nonene-5, an octylic acid salt of 1,5-diazabicyclo(4.3.0)-nonene-5, a carbonate of 1,5-diazabicyclo(4.3.0)-nonene-5, a stearic acid salt of 1,5-diazabicyclo(4.3.0)-nonene-5, a 2-ethylhexylic acid salt of 1,5-diazabicyclo(4.3.0)-nonene-5, a benzoic acid salt of 1,5-diazabicyclo (4.3.0)-nonene-5, a salicylic acid salt of 1,5-diazabicyclo (4.3.0)-nonene-5, a 3-hydroxy-2-naphthoic acid salt of 1,5-diazabicyclo(4.3.0)-nonene-5, a 2-mercaptobenzothiazole salt of 1,5-diazabicyclo(4.3.0)-nonene-5, a 2-mercaptobenzimidazole salt of 1,5-diazabicyclo(4.3.0)-nonene-5, 1,8-diazabicyclo(5.4.0) undecene-7, and 1,5-diazabicyclo(4.3.0)-nonene-5.

The compound (b) is preferably at least one compound selected from the group consisting of a p-toluenesulfonic acid salt of 1,8-diazabicyclo(5.4.0) undecene-7, a phenol salt of 1,8-diazabicyclo(5.4.0) undecene-7, a phenolic resin salt of 1,8-diazabicyclo(5.4.0) undecene-7, an orthophthalic acid salt of 1,8-diazabicyclo(5.4.0) undecene-7, a formic acid salt of 1,8-diazabicyclo(5.4.0) undecene-7, an octylic acid salt of 1,8-diazabicyclo(5.4.0) undecene-7, a p-toluenesulfonic acid salt of 1,5-diazabicyclo(4.3.0)-nonene-5, a phenol salt of 1,5-diazabicyclo(4.3.0)-nonene-5, a phenolic resin salt of 1,5-diazabicyclo(4.3.0)-nonene-5, an orthophthalic acid salt of 1,5-diazabicyclo(4.3.0)-nonene-5, a formic acid salt of 1,5-diazabicyclo(4.3.0)-nonene-5, an octylic acid salt of 1,5-diazabicyclo(4.3.0)-nonene-5, 1,8-diazabicyclo(5.4.0) undecene-7, and 1,5-diazabicyclo(4.3.0)-nonene-5.

From the viewpoint of an improvement in the adhesiveness, the compound (b) is more preferably a phenolic salt of 1,8-diazabicyclo(5.4.0) undecene-7.

From the viewpoint of goodness in the adhesiveness, the amount of the compound (b) is preferably from 0.3 to 3.0 parts by weight for 100 parts by weight of the epichlorohydrin rubber (a). The amount is more preferably from 0.5 to 2.0 parts by weight. From the viewpoint of goodness in the adhesiveness and good in the vulcanization property, the amount of the compound (b) is preferably from 0.5 to 1.5 parts by weight for 100 parts by weight of the epichlorohydrin rubber (a).

The rubber composition for vulcanization contains, as essential component, the epichlorohydrin rubber (a), the vulcanizing agent (e), the water-carrying substance (c), and the compound (b), and may further contain, as an optional component, an epoxy resin (d). When the rubber composition for vulcanization is, particularly, a composition the epoxy resin (d) besides the epichlorohydrin rubber (a), the compound (b), the water-carrying substance (c), and the vulcanizing agent (e), the layers (A) and (B) can be bonded with a larger adhesive force. The epoxy resin (d) is preferably, for example, at least one selected from the group consisting of bisphenol A type epoxy resin, bisphenol F type epoxy resin, phenol novolak type epoxy resin, o-cresol novolak type epoxy resin, amine type epoxy resin, hydrogenated bisphenol A type epoxy resin, and polyfunctional epoxy resin. Of these examples, bisphenol A type epoxy resin is preferred since the resin is good in chemical resistance and adhesiveness. Furthermore, an epoxy resin represented by the following formula (1) is particularly preferred:

more preferably from 0.1 to 0.3. If n is less than 0.1, the layer (A) tends to be lowered in adhesive force onto the fluorine-contained polymer layer (B). If n is more than 3, the epoxy resin itself tends to be raised in viscosity not to be evenly dispersed with ease in the rubber composition for vulcanization.

In order to make the layer (A) better in adhesive force onto the fluorine-contained polymer layer (B), the amount of the epoxy resin (d) is preferably from 0.1 to 5 parts by weight, more preferably from 0.3 to 3 parts by weight for 100 parts by weight of the epichlorohydrin rubber (a).

A preferred embodiment of the rubber composition for vulcanization is an embodiment in which the total amount of the compound (b) and the epoxy resin (d) is more than 2.0 parts by weight for 100 parts by weight of the epichlorohydrin rubber (a).

The rubber composition for vulcanization may further contain a resin other than epoxy resin to give a property different from that of the epichlorohydrin rubber (a) to the rubber layer (A). Examples of the resin include polymethyl methacrylate (PMMA) resin, polystyrene (PS) resin, polyurethane (PUR) resin, polyvinyl chloride (PVC) resin, ethylene/vinyl acetate (EVA) resin, styrene/acrylonitrile (AS) resin, polyethylene (PE) resin, chlorinated polystyrene, chlorosulfonated polyethylene or the like. In this case, the blend amount of the resin is preferably from 1 to 50 parts by weight for 100 parts by weight of the epichlorohydrin rubber (a).

In accordance with purpose or need, ordinary additives blendable into ordinary rubber composition for vulcanization may be blended into the present invention, examples thereof including a filler, a working auxiliary, a plasticizer, an acid-receiving agent, a softener, an anti-aging agent, a colorant, a stabilizer, an adhesive auxiliary, a releasing agent, an electric conductive agent, a thermal conductive agent, a surface non-adhesive agent, an adhesive, a flexibilizer, a heat resistance improver, a flame retardant, an ultraviolet absorber, an oil resistance improver, a foaming agent, a scorch preventive, a lubricant, and various other additives. Ordinary vulcanizing agents and vulcanizing accelerators different from those described above may be blended thereinto alone or in combination of two or more thereof. However, these additives may be blended in an amount not permitting the adhesive force onto the fluorine-contained polymer layer (B), which is a purpose of the present invention, to be damaged.

Examples of the filler include metal sulfides such as molybdenum disulfide, iron sulfide and copper sulfide, diatomaceous earth, asbestos, lithopone (zinc sulfide/barium sulfide), graphite, carbon black, carbon fluoride, calcium fluoride, coke, fine quartz particles, talc, mica powder, wollastonite, carbon fiber, aramide fiber, various whiskers, glass fiber, organic reinforcing agents, and organic fillers.

Examples of the working auxiliary include higher aliphatic acids such as stearic acid, oleic acid, palmitic acid, and lauric

[Formula 2]

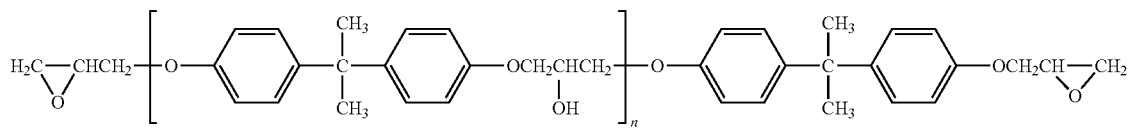

(1)

In the formula (1), n is a value of the average, and is preferably from 0.1 to 3, more preferably from 0.1 to 0.5, even acid; higher aliphatic acid salts such as sodium stearate, and zinc stearate; higher aliphatic acid amides such as stearic amide, and oleic amide; higher aliphatic acid esters such as ethyl oleate; higher aliphatic amines such as stearylamine, and oleylamine; petroleum waxes such as carnauba wax, and ceresin wax; polyglycols such as ethylene glycol, glycerin, and diethylene glycol; aliphatic hydrocarbons such as Vaseline, and paraffin; and silicone oils, silicone polymers, low molecular weight polyethylene, phthalic acid esters, phosphoric acid esters, rosin, (halogenated) dialkylamines, (halogenated) dialkylsulfones, and surfactants.

Examples of the plasticizer include phthalic acid derivatives, and sebacic acid derivatives; examples of the softener, lubricant oils, process oil, coal tar, castor oil, and calcium stearate; and examples of the anti-aging agent, phenylenediamines, phosphates, quinolines, cresols, phenols, and dithiocarbamate metal salts.

The rubber composition for vulcanization is prepared by mixing and kneading the epichlorohydrin rubber (a), vulcanizing agent (e), the water-carrying substance (c) and the compound (b) with each other, and optionally mixing the epoxy resin (d) and the other additives further therewith.

The mixing and kneading may be attained, using, for example, an open roll, a Banbury mixer, or a pressurizing kneader at a temperature of 100° C. or lower.

The following will describe the fluorine-contained polymer (other than any fluorine-contained polymer having a copolymerization unit originating from chlorotrifluoroethylene) layer (B) in the laminated body of the present invention.

The fluorine-contained polymer (other than any fluorine-contained polymer having a copolymerization unit originating from chlorotrifluoroethylene) layer (B) is made of a composition containing a fluorine-contained polymer. The fluorine-contained polymer is, for example, a fluorine-contained rubber or a fluororesin, and is preferably a polymer having at least one polymerization unit selected from a polymerization unit based on vinylidene fluoride, a polymerization unit based on hexafluoropropene, a polymerization unit based on tetrafluoroethylene, and a polymerization unit based on perfluoroalkyl vinyl ether. The fluorine-contained rubber is preferably an elastic copolymer fluorinated into a high degree, and is, for example, a copolymer made from vinylidene fluoride, and a fluorine-contained olefin copolymerizable with a different monomer. Examples of the fluorine-contained olefin include hexafluoropropene, pentafluoropropene, trifluoroethylene, tetrifluoroethylene, vinyl fluoride, perfluoromethyl vinyl ether, and perfluoropropyl vinyl ether. One or more of these examples are used as the copolymerizable component. Examples of the fluororesin include vinylidenefluoride/hexafluoropropene binary copolymer, vinylidenefluoride/hexafluoropropene/tetrafluoroethylene terpolymer, vinylidenefluoride/fluoromethyl vinyl ether/tetrafluoroethylene terpolymer, tetrafluoroethylene/propylene binary copolymer, vinylidenefluoride/tetrafluoroethylene/tetrafluoroethylene terpolymer, ethylene/tetrafluoroethylene binary copolymer, hexafluoropropene/tetrafluoroethylene binary copolymer, polyvinylidene fluoride, and polytetrafluoroethylene.

In accordance with purpose, known compounding agents are added to the fluorine-contained polymer layer (B), examples of the agents including a vulcanizing agent, a vulcanizing accelerator, a stabilizer, a colorant, a plasticizer, and a reinforcing agent.

The method for producing the laminated body in the present invention may be a method of laminating the two compositions onto each other by co-extrusion molding or sequential extrusion molding, and next heating/vulcanizing the laminated body through vapor, or heating/vulcanizing/shaping the laminated body through vapor. The method may be a method of heating/vulcanizing one of the rubber compositions weakly into such a degree that the shape thereof is not broken, laminating the two onto each other, and heating/vulcanizing/shaping the laminated body sufficiently through vapor. A means other than the above-mentioned vapor-heating/vulcanizing of the laminated body, which has been subjected to the laminating by the extrusion molding, may a known means such as mold-heating, an air bath, infrared rays, microwaves, or lead-covering vulcanization. Such a known means may be adopted at will. In the vulcanization, the heating temperature is usually from 100 to 200° C., and the heating period, which is varied in accordance with the temperature, is selected from the range of 0.5 to 300 minutes.

Typical examples of an embodiment in which the laminated body of the present invention is applied to a fuel oil system hose include a two-layer hose in which the fluorine-contained polymer is arranged as an inside layer of the hose and the epichlorohydrin rubber is arranged as an outside layer thereof, a three-layer hose in which a braided reinforcing layer is arranged outside the two-layer hose, and a four-layer hose in which a rubber layer is further arranged outside the three-layer hose. Examples of the material of the braid used ordinarily in the three-layer hose or the four-layer hose include braided polyester fiber, polyamide fiber, glass fiber, vinylon fiber, and cotton. Examples of the material of the outermost layer used ordinarily in the four-layer hose include epichlorohydrin rubber, ethylene/acrylate rubber, chloroprene rubber, chlorinated polyethylene rubber, chlorosulfonated polyethylene, and other synthetic rubbers having heat aging resistance, weather resistance, oil resistance and others.

The composition of the present invention for vulcanizing adhesion is formed as described above, and the laminated body thereof is excellent in adhesiveness between its two layers and their adhesive faces are strong. Accordingly, the laminated body is very useful for a fuel hose, a filler hose, and any other article having a surface to be exposed to an environment against which rancidity gasoline resistance, gasoline permeability resistance, and alcohol-containing gasoline resistance, and others are required, and having another surface to be exposed to an environment against which aging resistance, weather resistance, gasoline resistance and others are required.

Typical examples will be described as working examples below. However, the present invention is not limited thereto.

Hereinafter, a description will be made about working examples and comparative examples each using at least one rubber selected from the group consisting of acrylonitrile butadiene rubber (NBR), hydrogenated NBR (H-NBR), acrylic rubber (ACM), ethylene acrylate rubber (AEM), fluorine-contained rubber (FKM), chloroprene rubber (CR), chlorosulfonated polyethylene (CSM), chlorinated polyethylene (CPE), and ethylene propylene rubbers (EPM and EPDM).

EXAMPLES

Examples and Comparative Examples

Each rubber composition shown in Table 1 was mixed and kneaded through a kneader and an open roll to yield each sheet (i) having a thickness of 2 to 2.5 mm. Separately, pellets of a fluororesin (tetrafluoroethylene/hexafluoropropene/vinylidene fluoride terpolymer: Dyneon THV-500G, manufactured by Minnesota Mining & Manufacturing Co.) were pressured at 20 to 25 kg/cm$^2$ in a mold the temperature of which was kept at the melting point thereof or higher for 4 minutes to yield plural pieces of a sheet (ii) having a thickness of 0.3 to 0.5 mm.

(Laminated Bodies)

As shown in Table 2, each of the sheets (i) was caused to adhere onto anyone of the sheet (ii) pieces, and the adhesion body was pressured at 160° C. and 20 to 25 kg/cm² for 30 minutes to yield each rubber/resin laminated body having a thickness of 2.3 to 3.0 mm.

(Adhesiveness Evaluation)

Each of the vulcanized laminate bodies was cut into the form of a strip 1.0×10 cm in size to be made into a test piece for an adhesion test. At 25° C., a T peeling test was made thereabout at a pulling speed of 50 mm/min. The state of a peel of the piece was observed with the naked eye. An evaluating criterion for the peel state is shown below. The results are shown in Table 2.

(Peel State Evaluation)

◯: The layers are bonded strongly to each other so that the rubber is broken between the layers.

x: The layers are not bonded at all to each other to be peeled at the interface.

Compounding agents used in the working examples and the comparative examples are shown below.

*1 "N-2305", manufactured by JSR Corp.
*2 "NV-72", manufactured by JSR Corp.
*3 "Zetpol 2020", manufactured by Zeon Corp.
*4 "Hyperon #40", manufactured by Du Pont
*5 "Seast SO", manufactured by Tokai Carbon Co., Ltd.
*6 "Burgess #30", manufactured by Burgess Pigment Co.
*7 "Adeka Seizure RS107", manufactured by Adeka Corp.
*8 "Paraffin Wax", manufactured by Nippon Seiro Co., Ltd.
*9 "Nocrac OD", manufactured by Ouchi Shinko Chemical Industrial Co., Ltd.
*10 "Nocrac MBZ", manufactured by Ouchi Shinko Chemical Industrial Co., Ltd.
*11 "Nocrac NBC", manufactured by Ouchi Shinko Chemical Industrial Co., Ltd.
*12 "Nocceler CZ", manufactured by Ouchi Shinko Chemical Industrial Co., Ltd.
*13 "Nocceler TT", manufactured by Ouchi Shinko Chemical Industrial Co., Ltd.
*14 "Nocceler DM", manufactured by Ouchi Shinko Chemical Industrial Co., Ltd.
*15 "Nocceler TRA", manufactured by Ouchi Shinko Chemical Industrial Co., Ltd.
*16 "JER 828", manufactured by Mitsubishi Chemical Co.
*17 "U-CAT SA-1", manufactured by San-Apro Ltd.

TABLE 1

| Blended components (unit: parts by weight) | No. 1 | No. 2 | No. 3 | No. 4 | No. 5 | No. 6 | No. 7 | No. 8 |
|---|---|---|---|---|---|---|---|---|
| Nitrile rubber *1 (a) | 100 | 100 | | | | | | |
| Vinyl chloride blended nitrile rubber *2 (a) | | | 100 | 100 | | | | |
| H-NBR *3 (a) | | | | | 100 | 100 | | |
| CSM *4 (a) | | | | | | | 100 | 100 |
| FEF carbon *5 (filler) | 50 | 50 | 50 | 50 | 50 | 50 | 1 | 1 |
| Calcium carbonate (filler) | | | | | | | 40 | 40 |
| Hard clay *6 (filler) | | | | | | | 30 | 30 |
| Dioctyl phthalate (plasticizer) | 10 | 10 | 10 | 10 | | | 30 | 30 |
| Di(butoxyethoxy)ethyl adipate *7 (plasticizer) | | | | | 10 | 10 | | |
| Stearic acid (lubricant) | 1 | 1 | 1 | 1 | 1 | 1 | | |
| Paraffin wax *8 (lubricant) | | | | | | | 3 | 3 |
| Alkylated diphenylamine *9 (anti-aging agent) | 2 | 2 | 2 | 2 | 1.5 | 1.5 | | |
| Zinc salt of 2-mercaptobenzimidazole *10 (anti-aging agent) | | | | | 1 | 1 | | |
| Nickel dibutyldithiocarbamate *11 (anti-aging agent) | | | | | | | 1 | 1 |
| Cyclohexylbenzothiazylsulfeneamide *12 (vulcanizing accelerator) | 1 | 1 | 1 | 1 | 1 | 1 | | |
| Tetramethylthiuram disulfide *13 (vulcanizing accelerator) | 2 | 2 | 2 | 2 | 2 | 2 | | |
| Di-2-benzothiazolyl disulfide *14 (vulcanizing accelerator) | | | | | | | 1 | 1 |
| Dipentamethylenethiuram tetrasulfide *15 (vulcanizing accelerator) | | | | | | | 2 | 2 |
| Zinc oxide (vulcanization acceleration auxiliary) | 5 | 5 | 5 | 5 | 5 | 5 | | |
| Magnesium oxide (vulcanization acceleration auxiliary) | | | | | | | 10 | 10 |
| Calcium sulfate dihydrate (c) | 5 | | 5 | | 5 | | 5 | |
| Epoxy resin *16 (d) | 1.5 | | 1.5 | | 1.5 | | 1.5 | |
| Phenol salt of DBU *17 (b) | 1 | | 1 | | 1 | | 1 | |
| Sulfur | 0.5 | 0.5 | 0.5 | 0.5 | 0.5 | 0.5 | | |

TABLE 2

Evaluation result of adhesiveness between two vulcanized rubbers

|  |  | Example 1 | Comparative Example 1 | Example 2 | Comparative Example 2 | Example 3 | Comparative Example 3 | Example 4 | Comparative Example 4 |
|---|---|---|---|---|---|---|---|---|---|
| Laminated body | Sheet (i) | No. 1 | No. 2 | No. 3 | No. 4 | No. 5 | No. 6 | No. 7 | No. 8 |
|  | Sheet (ii) | THV-500G | THV-500G | THV-500G | THV-500G | THV-500G | THV-500G | THV-500G | THV-500G |
| Peel state | | ○ | X | ○ | X | ○ | X | ○ | X |

As shown in Table 2, about each of Examples 1 to 4, which was a laminated body using a composition of the present invention for vulcanizing adhesion, the adhesiveness between the two layers was very good. Furthermore, their adhesive faces were not peeled, and the adhesive faces were strong.

The following will describe working examples and comparative examples each using epichlorohydrin rubber as the rubber (a).

Examples and Comparative Examples

Each epichlorohydrin rubber composition shown in each of Tables 3 and 4 was kneaded through a kneader and an open roll to yield each sheet (i) having a thickness of 2 to 2.5 mm. Separately, pellets of each fluororesin shown in Table 5 were pressured at 20 to 25 kg/cm² in a mold the temperature of which was kept at the melting point thereof or higher for 4 minutes to yield plural pieces of each sheet (ii) having a thickness of 0.3 to 0.5 mm.

(Laminated Bodies)
As shown in Tables 6 to 8, each of the sheets (i) was caused to adhere onto any one of the pieces of one or each of the sheets (ii), and the adhesion body was pressured at 160° C. and 20 to 25 kg/cm² for 30 minutes to yield each rubber/resin laminated body having a thickness of 2.3 to 3.0 mm.

(Adhesiveness Evaluation Before Immersion in Fuel Oil)
Each of the vulcanized laminate bodies was cut into the form of a strip 1.0×10 cm in size to be made into a test piece for an adhesion test. At 25° C., a T peeling test was made thereabout at a pulling speed of 50 mm/min. The state of a peel of the piece was observed with the naked eye. An evaluating criterion for the peel state is shown below. The results are shown in Tables 6 to 8.

(Adhesiveness Evaluation After Immersion in Fuel Oil)
Each of the same test pieces for an adhesion test as described above was used to make a liquid resistance test described JIS K6258. The used fuel oil was a fuel oil D for tests. The test piece was immersed therein at 40° C. for 2 days. Thereafter, in the same way, at 25° C., a T peeling test was made thereabout at a pulling speed of 50 mm/min. The state of a peel of the piece was observed with the naked eye. An evaluating criterion for the peel state is shown below. The results are shown in Tables 6 to 8.

(Peel State Evaluation)
○: The layers are bonded strongly to each other so that the rubber is broken between the layers.
Δ: The layers are bonded to each other, or not, so that the results are varied.
x: The layers are not bonded at all to each other to be peeled at the interface.

Compounding agents used in the working examples and the comparative examples are shown below.

*18 "Epichlorohydrin/ethylene oxide/ally glycidyl ether copolymer, Epichlomer CG", manufactured by Daiso Co., Ltd.

*19 "DHT-4A", manufactured by Kyowa Chemical Industry Co., Ltd.
*20 "U-CAT SA-1", manufactured by San-Apro Ltd.
*21 "U-CAT SA-603", manufactured by San-Apro Ltd.
*22 "JER 828", manufactured by Mitsubishi Chemical Co.
*23 "Daisonet XL-21S", manufactured by Daiso Co., Ltd.
*24 Tetrafluoroethylene/hexafluoropropylene/vinylidene fluoride terpolymer "Dyneon THV 500G", manufactured by Minnesota Mining & Manufacturing Co.
*25 Tetrafluoroethylene/hexafluoropropylene/vinylidene fluoride terpolymer "Dyneon THV 815G", manufactured by Minnesota Mining & Manufacturing Co.

TABLE 3

Blended components of each epichlorohydrin layer

| | Blend Nos. | | | | |
|---|---|---|---|---|---|
| Blended components (unit: parts by weight) | No. 9 | No. 10 | No. 11 | No. 12 | No. 13 |
| ECH/EO/AGE copolymer rubber *18(a) | 100 | 100 | 100 | 100 | 100 |
| FEF carbon (reinforcing agent) (filler) | 50 | 50 | 50 | 50 | 50 |
| Di(butoxyethoxy)ethyl adipate (plasticizer) | 10 | 10 | 10 | 10 | 10 |
| Sorbitan monostearate (lubricant) | 3 | 3 | 3 | 3 | 3 |
| Nickel dibutyldithiocarbamate (anti-aging agent) | 1 | 1 | 1 | 1 | 1 |
| Copper dimethyldithiocarbamate (acid-receiving agent) | 0.1 | 0.1 | 0.1 | 0.1 | 0.1 |
| Synthetic hydrotalcite *19 (acid-receiving agent) | 3 | 3 | 3 | 3 | 3 |
| Magnesium oxide (acid-receiving agent) | 3 | 3 | 3 | 3 | 3 |
| Phenol salt of DBU *20 (b) | 1 | 1 | 1 | 1 | |
| Formic acid salt of DBU *21(b) | | | | | 1 |
| Calcium sulfate dihydrate (c) | 5 | 20 | | | 5 |
| Magnesium sulfate heptahydrate (c) | | | 5 | | |
| Calcium acetate monohydrate (c) | | | | 5 | |
| Epoxy resin *22 (d) | 1.5 | 1.5 | 1.5 | 1.5 | 1.5 |
| N-cyclohexylthiophthalimide (retardant) | 1 | 1 | 1 | 1 | 1 |
| 6-Methylquinoxaline-2,3-dithiocarbonate *23(e) | 1.7 | 1.7 | 1.7 | 1.7 | 1.7 |

TABLE 4

Blended components of each epichlorohydrin layer

| | Blend Nos. | |
|---|---|---|
| Blended components (unit: parts by weight) | No. 14 | No. 15 |
| ECH/EO/AGE Copolymer rubber *18(a) | 100 | 100 |
| FEF carbon (reinforcing agent) | 50 | 50 |

TABLE 4-continued

Blended components of each epichlorohydrin layer

| Blended components (unit: parts by weight) | Blend Nos. No. 14 | No. 15 |
|---|---|---|
| Di(butoxyethoxy)ethyl adipate (plasticizer) | 10 | 10 |
| Sorbitan monostearate (lubricant) | 3 | 3 |
| Nickel dibutyldithiocarbamate (anti-aging agent) | 1 | 1 |
| Copper dimethyldithiocarbamate (acid-receiving agent) | 0.1 | 0.1 |
| Synthetic hydrotalcite *19 (acid-receiving agent) | 3 | 3 |
| Magnesium oxide (acid-receiving agent) | 3 | 3 |
| Phenol salt of DBU *20 (b) | 1 | |
| Formic acid salt of DBU *21 (b) | | |
| Calcium sulfate dihydrate (c) | | 5 |
| Magnesium sulfate heptahydrate (c) | | |
| Calcium acetate monohydrate (c) | | |
| Epoxy resin *22 (d) | | |
| N-cyclohexylthiophthalimide (retardant) | 1 | 1 |
| 6-Methylquinoxaline-2,3-dithiocarbonate *23 (vulcanizing agent) | 1.7 | 1.7 |

TABLE 5

About fluororesins

| | |
|---|---|
| Fluororesin (A) *24 | Tetrafluoroethylene/hexafluoropropylene/vinylidene fluoride terpolymer "Dyneon THV 500G" |
| Fluororesin (B) *25 | Tetrafluoroethylene/hexafluoropropylene/vinylidene fluoride terpolymer "Dyneon THV 815G" |

TABLE 6

Evaluation result of adhesiveness between two vulcanized rubbers

| | | Example 5 | Example 6 | Example 7 | Example 8 | Example 9 |
|---|---|---|---|---|---|---|
| Laminated body | Epichlorohydrin layer (sheet (i)) | No. 9 | No. 10 | No. 11 | No. 12 | No. 13 |
| | Fluororesin layer (sheet (ii)) | A | A | A | A | A |
| Adhesiveness evaluation before immersion in fuel oil | | | | | | |
| Peel state | | ◯ | ◯ | ◯ | ◯ | ◯ |
| Adhesiveness evaluation after immersion in fuel oil | | | | | | |
| Peel state | | ◯ | ◯ | ◯ | ◯ | ◯ |

TABLE 7

Evaluation result of adhesiveness between two vulcanized rubbers

| | | Example 10 | Example 11 | Example 12 | Example 13 | Example 14 |
|---|---|---|---|---|---|---|
| Laminated body | Epichlorohydrin layer (sheet (i)) | No. 9 | No. 10 | No. 11 | No. 12 | No. 13 |
| | Fluororesin layer (sheet (ii)) | B | B | B | B | B |
| Adhesiveness evaluation before immersion in fuel oil | | | | | | |
| Peel state | | ◯ | ◯ | ◯ | ◯ | ◯ |
| Adhesiveness evaluation after immersion in fuel oil | | | | | | |
| Peel state | | ◯ | ◯ | ◯ | ◯ | ◯ |

TABLE 8

Evaluation result of adhesiveness between two vulcanized rubbers

|  |  | Comparative Example 5 | Comparative Example 6 | Comparative Example 7 | Comparative Example 8 |
|---|---|---|---|---|---|
| Laminated body | Epichlorohydrin layer (sheet (i)) | No. 14 | No. 15 | No. 14 | No. 15 |
|  | Fluororesin layer (sheet (ii)) | A | A | B | B |
| Adhesiveness evaluation before immersion in fuel oil |  |  |  |  |  |
| Peel state |  | Δ | x | x | x |
| Adhesiveness evaluation after immersion in fuel oil |  |  |  |  |  |
| Peel state |  | x | x | x | x |

As shown in Tables 6 and 7, Examples 5 to 14, which were each a vulcanized rubber laminated body of the present invention, were excellent in adhesiveness between the two vulcanized rubbers not only about the adhesion in the initial state (before the immersion in the fuel oil) but also about the adhesion after the immersion in the fuel oil. Their adhesive faces were not peeled, and the adhesive faces were strong.

INDUSTRIAL APPLICABILITY

The present invention provides a composition for vulcanizing adhesion that can give a vulcanized product excellent in adhesiveness to other substances (such as different polymers). For example, the present invention is combined with a fluorine-contained polymer to be usable as a laminated body.

What is claimed is:

1. A composition for vulcanizing adhesion, comprising a rubber (a), at least one compound (b) selected from the group consisting of salts of 1,8-diazabicyclo(5.4.0) undecene-7, salts of 1,5-diazabicyclo(4.3.0)-nonene-5, 1,8-diazabicyclo(5.4.0) undecene-7, and 1,5-diazabicyclo(4.3.0)-nonene-5, and at least one water-carrying substance (c) selected from a hydrate of a sulfate of a metal selected from the group consisting of calcium, magnesium, sodium, and copper, and/or a hydrate of an acetate of calcium.

2. The composition for vulcanizing adhesion according to claim 1, wherein the water-carrying substance (c) is a water-absorbed substance in which a polyether compound absorbs water, a water-absorbed substance in which a metal compound absorbs water, and/or a metal salt hydrate.

3. The composition for vulcanizing adhesion according to claim 1, further comprising an epoxy resin (d).

4. The composition for vulcanizing adhesion according to claim 1, wherein the rubber (a) is at least one rubber selected from the group consisting of acrylonitrile butadiene rubber (NBR), hydrogenated NBR (H-NBR), acrylic rubber (ACM), ethylene acrylate rubber (AEM), fluorine-contained rubber (FKM), chloroprene rubber (CR), chlorosulfonated polyethylene (CSM), chlorinated polyethylene (CPE), and ethylene propylene rubbers (EPM and EPDM).

5. The composition for vulcanizing adhesion according to claim 1, wherein the compound (b) is a least one compound selected from the group consisting of a p-toluenesulfonic acid salt of 1,8-diazabicyclo(5.4.0) undecene-7, a phenol salt of 1,8-diazabicyclo(5.4.0) undecene-7, a phenolic resin salt of 1,8-diazabicyclo(5.4.0) undecene-7, an orthophthalic acid salt of 1,8-diazabicyclo(5.4.0) undecene-7, a formic acid salt of 1,8-diazabicyclo(5.4.0) undecene-7, an octylic acid salt of 1,8-diazabicyclo(5.4.0) undecene-7, a p-toluenesulfonic acid salt of 1,5-diazabicyclo(4.3.0)-nonene-5, a phenol salt of 1,5-diazabicyclo(4.3.0)-nonene-5, a phenolic resin salt of 1,5-diazabicyclo(4.3.0)-nonene-5, an orthophthalic acid salt of 1,5-diazabicyclo(4.3.0)-nonene-5, a formic acid salt of 1,5-diazabicyclo(4.3.0)-nonene-5, an octylic acid salt of 1,5-diazabicyclo(4.3.0)-nonene-5, 1,8-diazabicyclo(5.4.0) undecene-7, and 1,5-diazabicyclo(4.3. 0)-nonene-5.

6. The composition for vulcanizing adhesion according to claim 1, wherein the amount of the compound (b) is from 0.1 to 10 parts by weight for 100 parts by weight of the rubber (a).

7. The composition for vulcanizing adhesion according to claim 1, further comprising a vulcanizing agent (e), wherein the rubber (a) is epichlorohydrin rubber.

8. The composition for vulcanizing adhesion according to claim 6, wherein the vulcanizing agent (e) is at least one vulcanizing agent selected from the group consisting of quinoxaline vulcanizing agents, thiourea vulcanizing agents, mercaptotriazine vulcanizing agents, bisphenol vulcanizing agents, sulfur-contained vulcanizing agents, and peroxide vulcanizing agents.

9. The composition for vulcanizing adhesion according to claim 7, wherein the epichlorohydrin rubber is a polymer having a polymerization unit based on epichlorohydrin, and a polymerization unit based on ethylene oxide.

10. The composition for vulcanizing adhesion according to claim 7, wherein the epichlorohydrin rubber is a polymer having a polymerization unit based on epichlorohydrin, a polymerization unit based on ethylene oxide, and a polymerization unit based on ally glycidyl ether.

11. The composition for vulcanizing adhesion according to claim 7, wherein the amount of the compound (b) is from 0.5 to 3.0 parts by weight for 100 parts by weight of the epichlorohydrin rubber.

12. A laminated body, wherein the composition, for vulcanizing adhesion, recited in claim 1 is used.

13. A tube or hose, comprising the laminated body recited in claim 12.

14. A fuel pipe for an automobile, comprising the tube or hose recited in claim 13.

* * * * *